(12) United States Patent
Chae et al.

(10) Patent No.: US 10,181,305 B2
(45) Date of Patent: Jan. 15, 2019

(54) METHOD OF CONTROLLING DISPLAY AND ELECTRONIC DEVICE FOR PROVIDING THE SAME

(71) Applicant: Samsung Electronics Co., Ltd., Gyeonggi-do (KR)

(72) Inventors: Sangwon Chae, Seoul (KR); Insu Yu, Seoul (KR); Jungeun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 28 days.

(21) Appl. No.: 14/714,601

(22) Filed: May 18, 2015

(65) Prior Publication Data
US 2015/0348493 A1 Dec. 3, 2015

(30) Foreign Application Priority Data

May 27, 2014 (KR) .................. 10-2014-0063734
Oct. 24, 2014 (KR) .................. 10-2014-0144731

(51) Int. Cl.
*G09G 5/00* (2006.01)
*G09G 5/14* (2006.01)
*G09G 1/00* (2006.01)
*G06F 3/0481* (2013.01)

(52) U.S. Cl.
CPC ............ *G09G 5/00* (2013.01); *G06F 3/0481* (2013.01); *G09G 5/003* (2013.01); *G09G 5/14* (2013.01); *G06F 2203/04803* (2013.01); *G09G 2320/0613* (2013.01); *G09G 2330/021* (2013.01); *G09G 2340/04* (2013.01); *G09G 2340/0407* (2013.01); *G09G 2340/0428* (2013.01); *G09G 2340/0464* (2013.01); *G09G 2354/00* (2013.01); *G09G 2360/144* (2013.01)

(58) Field of Classification Search
CPC .... G09G 5/00; G09G 2330/021; G09G 5/003; G09G 5/14; G09G 2320/0613; G09G 340/04; G09G 2340/0428; G09G 2340/0464; G09G 2354/00; G09G 2360/144; G09G 2340/0407; G06F 2203/04803; G06F 3/0481
See application file for complete search history.

(56) References Cited

U.S. PATENT DOCUMENTS 7,489,825 B2  2/2009  Sirohey et al.
7,911,509 B2  3/2011  Jendbro
8,363,044 B2  1/2013  Fletcher et al.
(Continued)

OTHER PUBLICATIONS

European Search Report dated Jan. 2, 2018.

*Primary Examiner* — Charles Hicks
(74) *Attorney, Agent, or Firm* — Cha & Reiter, LLC.

(57) ABSTRACT

An electronic device, method and computer readable medium are disclosed herein. The electronic device may comprise memory, such as the computer readable medium. The memory may include program instructions executable to implement the method, including identifying, by a controller, load information of the electronic device including execution of an application, detecting screen display information based on the identified load information by the controller, and controlling a display of the electronic device to display an execution screen of the application on the based on the detected screen display information.

34 Claims, 22 Drawing Sheets

(56) References Cited

U.S. PATENT DOCUMENTS

| | | |
|---|---|---|
| 8,621,253 B1 | 12/2013 | Brown et al. |
| 2003/0137469 A1* | 7/2003 | Hansen ................. G06F 1/1613 345/3.1 |
| 2005/0096102 A1 | 5/2005 | Mock et al. |
| 2006/0101293 A1* | 5/2006 | Chandley ............. G06F 1/3203 713/300 |
| 2008/0055318 A1* | 3/2008 | Glen ....................... G09G 3/20 345/501 |
| 2008/0117198 A1* | 5/2008 | Furihata ............... G09G 3/2025 345/212 |
| 2009/0037605 A1* | 2/2009 | Li .......................... G06Q 20/12 709/246 |
| 2009/0102868 A1 | 4/2009 | Schindler |
| 2009/0160841 A1* | 6/2009 | Fletcher ................ G06F 1/3218 345/211 |
| 2010/0118019 A1* | 5/2010 | Cases .................... G06F 1/3218 345/212 |
| 2011/0128298 A1 | 6/2011 | Tsuchida |
| 2013/0031589 A1 | 1/2013 | Casanova et al. |
| 2014/0043534 A1* | 2/2014 | Nakaoka ............. H04N 13/007 348/563 |
| 2014/0063074 A1 | 3/2014 | Drzaic |
| 2014/0092140 A1 | 4/2014 | Wadhwa et al. |
| 2014/0104298 A1 | 4/2014 | Park et al. |

\* cited by examiner

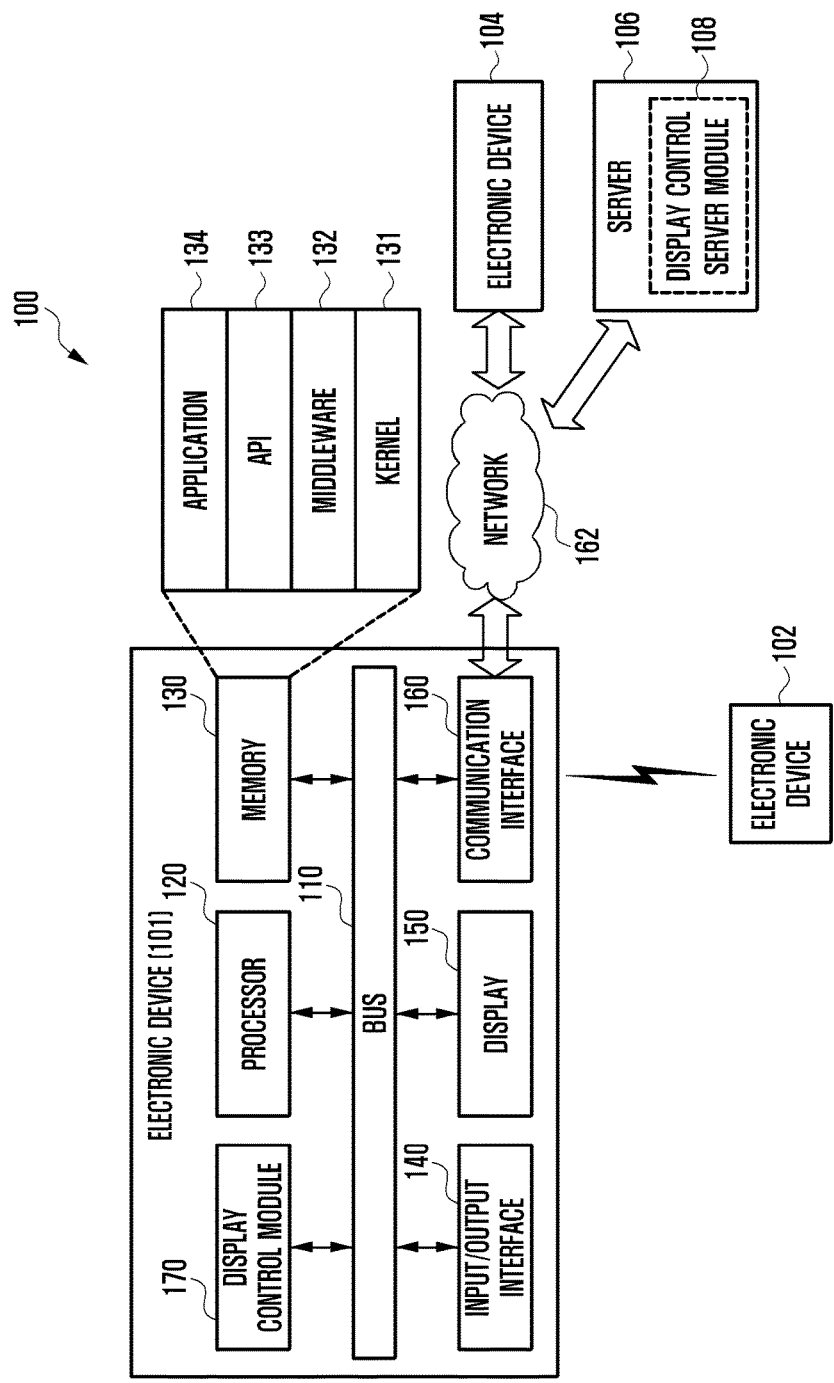

METHOD OF CONTROLLING DISPLAY AND ELECTRONIC DEVICE FOR PROVIDING THE SAME

CLAIM OF PRIORITY

This application claims priority from and the benefit under 35 U.S.C. § 119(a) of Korean Patent Application Nos. 10-2014-0063734 & 10-2014-0144731, filed on May 27, 2014 & Oct. 24, 2014, which are hereby incorporated by reference for all purposes as if fully set forth herein.

TECHNICAL FIELD

The present disclosure relates generally to a method of controlling a display and an electronic device for providing the same and, more particularly, to a method of providing a display based on a preset display control scheme and an electronic device for providing the same.

BACKGROUND

Recently, with the development of digital technologies, various portable terminals have been released, such as mobile communication terminals, Personal Digital Assistants (PDAs), electronic organizers, smart phones, and tablet Personal Computers (PCs). These terminals can perform communication and process personal information while users are traveling or otherwise moving. The portable terminals have reached mobile convergence in which the portable terminals embrace areas of other types of electronic terminals beyond the bounds of their conventional areas of functionality.

As an example of electronic devices, the portable terminal may have various functions including call functions such as a voice call and a video call, message transmission/reception functions such as a Short Message Service (SMS), a Multimedia Message Service (MMS), and an e-mail, an electronic organizer function, a photography function, a broadcast reproduction function, a video reproduction function, a music reproduction function, an Internet function, a messenger function, a Social Networking Service (SNS) function and the like. The portable terminal may display a user interface which may allow users to execute the functions using the user interface.

SUMMARY

An electronic device may have a display mounted thereon and display a user interface including various functions. Recently, with the development of displaying a user interface through a display, a portable terminal may display a high resolution user interface or application. However, when the portable terminal displays a high resolution application (such as, for example, in full-HD resolution), current consumption and memory use increase. The increases in current consumption and memory also increase a load of the portable terminal. The increases further cause the reduction in battery charge life and increased temperatures.

Accordingly, the following embodiments provide an electronic device capable of controlling a display according to a number of detected factors, and a method implementing the same.

In accordance with an aspect of the present disclosure, a method of controlling a display by an electronic device is provided. The method includes identifying, by a controller, load information of the electronic device according to execution of an application, detecting screen display information based on the identified load information by the controller, and controlling a display of the electronic device to display an execution screen of the application on a display of the electronic device based on the detected screen display information.

In accordance with another aspect of the present disclosure, a method of controlling a display by an electronic device is provided. The method includes: identifying load information of the electronic device according to execution of an application by a display control module, determining screen display information based on the identified load information by the display control module, controlling the display to display the execution screen of the application based on the determined screen display information by the display control module, generating a control signal for changing the screen display information by the display control module; updating the screen display information based on the generated control signal by the display control module, and controlling the display to display the application screen based on the updated screen display information by the display control module.

In accordance with another aspect of the present disclosure, a method of controlling a display by an electronic device is provided. The method includes: identifying load information of the electronic device according to execution of an application by a display control module, determining screen display information based on the identified load information by the display control module, controlling the display to display the execution screen of the application based on the determined screen display information by the display control module, dividing a screen to display the application and a second application into two or more display areas, determining screen display information based on determination of whether the display areas are activated according to detection of user inputs for the display areas of the application and the second application or contents provided by the application and the second application, and displaying execution screen of the application and the execution screen of the second application in the two or more display areas based on the determined screen display information.

In accordance with another aspect of the present disclosure, a method of controlling a display by an electronic device is provided. The method includes: identifying load information of the electronic device according to execution of an application by a display control module, determining screen display information based on the identified load information by the display control module, controlling the display to display the execution screen of the application based on the determined screen display information by the display control module, displaying the application as a virtual object by a processor, determining whether a screen switching data value including the load information of the electronic device is larger than a preset threshold switching data value by the processor, determining a resolution based on a result of the determination by the display control module, and rendering the application based on the determined resolution by the display control module.

In accordance with another aspect of the present disclosure, a method of controlling a display by an electronic device is provided. The method includes: identifying load information of the electronic device according to execution of an application by a display control module, determining screen display information based on the identified load information by the display control module, controlling the display to display the execution screen of the application based on the determined screen display information by the display control module, acquiring information of the electronic device; determining color depth information based on the acquired information by the display control module, generating screen display information based on the determined color depth information by the display control module, and displaying the application based on the generated screen display information by the display control module.

In accordance with another aspect of the present disclosure, a method of controlling a display by an electronic device is provided. The method includes: identifying load information of the electronic device according to execution of an application by a display control module, determining screen display information based on the identified load information by the display control module; controlling the display to display the execution screen of the application based on the determined screen display information by the display control module, receiving state information of another electronic device from the other electronic device by the communication interface, determining color depth information based on the received state information of the other electronic device by the display control module, generating screen display information based on the determined color depth information by the display control module, and transmitting the generated screen display information to the other electronic device by the communication interface.

In another aspect of this invention, an electronic device is disclosed including a display for displaying an application, and a controller for identifying load information of the electronic device according to execution of the application, detecting screen display information based on the identified load information, and controlling the display to display an execution screen of the application based on the detected screen display information.

An electronic device according to an embodiment of the present disclosure can increase a user's accessibility and availability with respect to screen display information of the electronic device, thereby increasing user convenience and usability.

An electronic device according to an embodiment of the present disclosure may determine screen display information based on a state of the electronic device, thereby increasing effects such as reductions in current consumption and memory use of the electronic device and an increase in battery use time.

An electronic device according to an embodiment of the present disclosure may determine a resolution based on motion information and vertical synchronization time of the electronic device, thereby making effects such as recognition improvement of a screen by a user of the electronic device.

An electronic device according to an embodiment of the present disclosure may change a color depth based on a state of the electronic device, thereby making effects such as a reduction in current consumption of the electronic device and an increase in battery use time.

In another aspect of this disclosure, a computer-readable storage medium having a program recorded therein, the program comprising program instructions executable by a processor to: execute an application in response to detecting an input event for executing the application, identify load information of the processor according to the execution of the application, detecting screen display information based on the identified load information, and control a display to display an execution screen of the executed application based on the detected screen display information.

BRIEF DESCRIPTION OF THE DRAWINGS

The present disclosure will be more apparent from the following detailed description in conjunction with the accompanying drawings, in which:

FIG. 1 illustrates an example network environment including an electronic device according to various embodiments of the present disclosure;

DETAILED DESCRIPTION

Figure 2A:
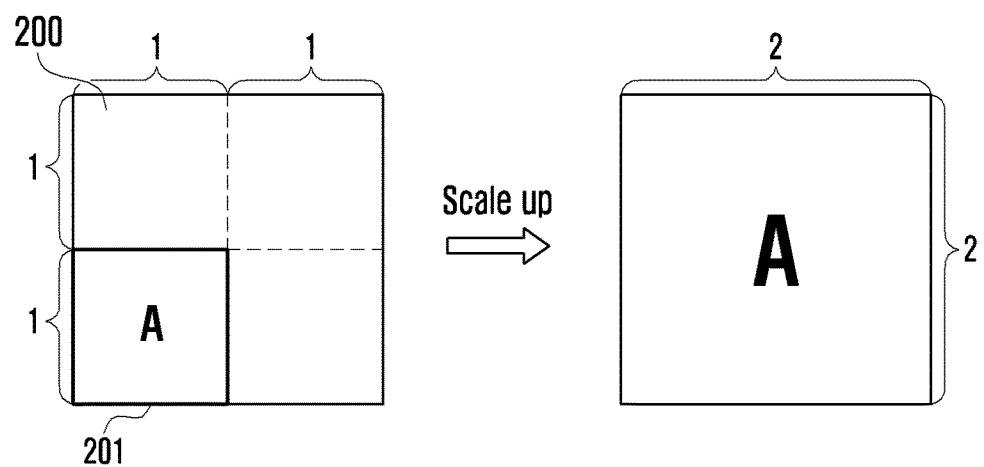
FIG. 2A, FIG. 2B, FIG. 2C and FIG. 2D schematically illustrate an example operation for controlling a display of an application by an electronic device according to various embodiments of the present disclosure.

Hereinafter, example embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (such as, for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (such as, for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (such as, for example, Samsung HomeSync™, Apple TV™, or Google TV™), an electronic dictionary, vehicle infotainment device, an electronic equipment for a ship (such as, for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and a display control module 170. Some components of the electronic device according to an embodiment may be omitted or further added. For example, the electronic device 101 according to an embodiment may include an electronic device 101 having no display 150.

The bus 110 may be a circuit which interconnects the above-described elements and delivers a communication (e.g., a control message) between the above-described elements.

The processor 120 may receive commands from the above-described other elements (e.g., the memory 130, input/output interface 140, the display module 150, the communication module 160, the display control module 170, etc.) through the bus 110, may interpret the received commands, and may execute calculation or data processing according to the interpreted commands.

The processor 120 according to an embodiment of the present disclosure may make a control to display an application as a virtual object. The processor 120 according to an embodiment may make a control to display a screen of an executed application (such as, for example, a game application or video application) in three dimensions. For example, the processor 120 may make a control to display information which does not exist in an actual user space of the electronic device 101 as a virtual reality through the display 150 and the electronic device 101. Additionally, the processor 120 may make a control to display an augmented reality through a combination of actual space information of the user of the electronic device 101 and preset virtual information.

The processor 120 according to an embodiment may identify a screen switching data value of the electronic device 101 detected through a motion sensor. The processor 120 according to an embodiment may identify a screen switching data value according to movement of the electronic device 101 measured through at least one sensor (such as, for example, a gesture sensor 1540A, a gyro sensor 1540B, or an acceleration sensor 1540E) of a sensor module 1540. The screen switching data value may be a data value (such as, for example, 5 m/s or 10 m/s) corresponding to movement of the electronic device 101.

The processor 120 according to an embodiment may determine whether a screen switching data value is larger than a preset threshold switching data value. The preset threshold switching data value may be preset and changed. The display control module 170 may determine a resolution based on a result of the determination of whether the screen switching data value is larger than the preset threshold switching data value and render an application based on the determined resolution. For example, if the screen switching data value corresponding to movement of the electronic device 101 is larger than the preset threshold switching data value (such as, for example, 20 m/s or 30 m/s), the processor 120 may reduce resolution or brightness of the displayed application.

The processor 120 according to an embodiment may identify a threshold switching data value at each level corresponding to movement of the electronic device 101 and may reduce a resolution of the application according to the level of the screen switching data value corresponding to the movement. For example, if a screen switching data value of the electronic device 101 is 10 m/s, the processor 120 may reduce a resolution of the application by one level (such as, for example, resolutions from 1280*720 to 1280*768 or from 1600*1200 to 1440*900; width*height; unit: pixels). For example, if a screen switching data value of the electronic device 101 is 20 m/s, the processor 120 may reduce a resolution of the application by two levels (such as, for example, from 1280*720 to 1152*864 or from 1600*1200 to 1400*1050; width*height; number of pixels). A rate of the reduction in the application resolution at each level and configuration of the resolution unit (such as, width*height, number of pixels) may change.

If a screen switching data value is larger than a preset threshold switching data value, the processor 120 according to an embodiment of the present disclosure may measure a rendering time of the application based on a data computation which indicates a quantity of calculations necessary to generate each frame. The rendering may be a graphic process for implementing a 2D or 3D graphic image on a screen.

The processor 120 according to an embodiment may measure a rendering time by analyzing rendering of the application having an original resolution. For example, the processor 120 may measure a rendering time of an application having a resolution of 800*600 (pixels, width*height).

The processor 120 according to an embodiment may determine whether the measured rendering time exceeds a preset vertical synchronization signal interval of the display 150. The vertical synchronization signal interval may be an interval (such as, for example, 60 fps) of the display 150 preset to display an image on the screen. The display 150 may display an image (such as, for example, an application or video) in the preset vertical synchronization signal interval (such as, for example, 60 fps). Here, fps (frame per second) may refer to the number of frames per second and correspond to the number of screens shown per second.

The processor 120 may determine a resolution based on a result of the determination of whether the measured rendering time exceeds the preset vertical synchronization signal interval. If the measured rendering time exceeds the preset vertical synchronization time interval of the display 150, the processor 120 according to an embodiment may determine a resolution having an interval (e.g., "fps") which can be supported by the display 150. For example, the processor 120 may identify a maximum interval which can be supported by the display 150 based on data (such as, for example, text data, image data, or screen switching data for each frame) included in the displayed application.

The processor 120 may render the application based on the resolution determined based on the identified interval. The processor 120 according to an embodiment may increase the size of the rendered application through a scaler and control the display 150 to display the increased application on the screen.

The memory 130 may store therein commands or data received from or created at the processor 120 or other elements (e.g., the input/output interface 140, the display 150, the communication interface 160, or the display control module 170, etc.). The memory 130 may include programming modules such as a kernel 131, a middleware 132, an application programming interface (or "API") 133, and an application 134. Each of the programming modules may be implemented in software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function, such as a turn-on/turn-off of an external electronic device or some components thereof, or an adjustment of brightness or resolution of a display of any external electronic device, such as the electronic device 104 communicating with the electronic device 101, a certain application operating at such an external electronic device, or a certain service, such as a call service or a message service, offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The display 150 according to an embodiment may display a screen displayed on an external device (such as, for example, an electronic device 102 or 104) through a mirroring technique without any change. The mirroring technique may be a technique for transmitting pixel information of a screen or content files displayed on a first device to a second device through a wire or wirelessly. For example, the first device may transmit screen information to the second device by using WLAN, WiFi, or DLNA. The second device may display, on a display of the second device, the same screen (such as, for example, within an error range of 5% or 10% of the screen of the first device) as the screen displayed on the first device based on the received screen information.

The communication interface 160 may perform a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

According to an embodiment, a server 106 may support the driving of the electronic device 101 by performing at least one of the operations (or a function) implemented by the electronic device 101. For example, the server 106 may include a display control server module 108 which can support the display control module 170 implemented in the electronic device 101. For example, the display control server module 108 may include at least one component of the display control module 170, and may perform (such as, for example, perform as a proxy) at least one operation performed by the display control module 170.

Each of the first and second external electronic devices 102 and 104 may be a device which is the same as or different from the electronic device 101. According to an embodiment, the server 106 may include a group of one or more servers. According to various embodiments, all or some of the operations performed by the electronic device 101 may be performed by another electronic device or a plurality of electronic devices (such as, for example, the electronic device 102 and 104 or the server 106).

According to an embodiment, when the electronic device 101 should perform some functions or services automatically or by a request, the electronic device 101 may make a request for performing at least some of the functions related to the functions or services to another device (such as, for example, the electronic device 102 or 104 or the server 106) instead of performing the functions or services by itself. The other electronic device (such as, for example, the electronic device 102 or 104 or the server 106) may carry out the requested function or the additional function and transfer a result thereof to the electronic device 101. The electronic device 101 may provide the requested functions or services based on the received result directly or after additional processing. To this end, for example, cloud computing, distributed computing, or client-server computing technology may be used.

If the display 150 receives an input event for executing an application, the electronic device 101 according to an embodiment of the present disclosure may identify load information of the electronic device 101 according to the execution of the application. The electronic device 101 may include the display control module for determining screen display information based on the identified load information and making a control to display the application based on the determined screen display information.

The display control module 170 may process at least some pieces of information acquired from other components (such as, for example, the processor 120, the memory 130, the input/output interface 140, the display 150, or the communication interface 160), and may provide the processed information to a user through various methods. For example, the display control module 170 may control at least some of the functions of the electronic device 101 by using the processor 120 or independently from the processor 120 such that the electronic device 101 interworks with another electronic device (such as, for example, electronic device 104 or server 106). According to an embodiment, at least one component of the display control module 170 may be included in the server 106 (such as, for example, the display control server module 108) and receive the support of at least one operation performed by the display control module 170 from the server 106. Although the processor 120 and the display control module 170 are separately depicted in FIG. 1, the processor 120 may include all or part of the display control module 170. Accordingly, the following display control module 170 can be replaced the processor 120 or a controller which includes at least one processor 120. Additional information on the display control module 170 will be provided through FIGS. 2 to 6 below.

If the display 150 receives an input event for executing an application, the display control module 170 according to an embodiment of the present disclosure may identify load information of the electronic device 101 according to the execution of the application. The display control module 170 may determine screen display information based on the identified load information and control the display 150 to display the application based on the determined screen display information. The application may refer to a set of programs designed to execute a particular task. For example, the application may include a screen of the electronic device (such as, for example, a screen in a turned on state, a standby screen, or a termination screen) or a program (such as, for example, a game, Word, or Excel) performing a particular function.

The load information of the electronic device 101 according to an embodiment may include memory capacity information of the electronic device 101 (load of application having capacity of 100 MB with respect to the electronic device 101 having memory capacity of 8 GB), temperature information, battery consumption information, and power use information of the electronic device 101. The load information may be pre-stored information or may be predicted by the display control module 170 by determining a required specification of the corresponding application (such as, for example, required capacity, resolution, supported operating system (such as, for example, Android, or iOS) according to the execution of the application.

The display control module 170 according to an embodiment may determine screen display information based on the identified load information. The screen display information may include at least one piece of information on a position where the application is displayed, information on a size of the application, scale information of the application to be enlarged, resolution information of the application, and color depth information of the application. For example, if available memory capacity of the electronic device 101 is lacking, the display control module 170 may determine to lower the resolution of the application. In another example, if a battery remaining capacity of the electronic device 101 is lacking, the display control module 170 may determine to lower the resolution of the application to be displayed.

The display control module 170 according to an embodiment may control the display 150 to display screen of the application based on the determined screen display information. For example, the display control module 170 may determine a position of the screen where the application is displayed, and make a control to display the application in the determined position based on a resolution value and a scale value.

For example, the display control module 170 may determine the size of the application as ¼ of the screen, determine the resolution as T85, and determine the scale value to change the size as 4. The determined application may be displayed with ¼ of the screen and a resolution of T85, and then scaled up four times to be displayed as an entire screen. The size information, scale information, and resolution information of the application may change. The resolution may mean a degree of how many pixels or dots are used for expressing an image, and may include T42, T85, T170, and T340 according to the degree. For example, T85 may refer to Gaussian grid (256*128) and T42 may refer to Gaussian grid (128*64).

The display control module 170 according to an embodiment may generate a control signal for changing screen display information. For example, the display 150 may display a user interface that provides a function for changing the screen display information. The display 150 may receive a change input event for changing the screen display information through the display user interface. The display 150 according to an embodiment may display a user interface related to a slide type (such as, for example, a type of changing screen display information according to a user's drag input event) or a list selection type (such as, for example, a type of selecting predetermined screen display information). The display 150 according to an embodiment may provide a separate user interface selected to use screen display information, which is lastly stored by the display control module 170.

The display control module 170 according to an embodiment may generate a change signal for changing screen display information generated based on state information of the electronic device 101. The change signal may be a signal for identifying temperature values of an Application Processor (AP) (e.g., 1510 of FIG. 15) of the electronic device 101, a battery (e.g., 1596 of FIG. 15), and a surface of a display (e.g., 1560 of FIG. 15) from one or more sensors and changing screen display information if the temperature value is larger than or equal to a preset threshold temperature value. For example, if the temperature of the battery of the electronic device 101 determined by a temperature/humidity sensor (e.g., 1540J of FIG. 15) rises due to execution of an application and thus is larger than or equal to a preset threshold temperature value (such as, for example, 18 or 30), the display control module 170 may generate the signal for changing the screen display information of the electronic device 101.

The display control module 170 according to an embodiment may change screen display information (such as, for example, resolution) being executed, as the temperature value becomes larger than or equal to the preset threshold temperature value. For example, the display control module 170 may change a high resolution (such as, for example, T340) of an application into a resolution of T170 or T85 and display the changed application. The preset threshold temperature value according to an embodiment may be divided according to a plurality of steps. The preset threshold temperature value is larger than or equal to 10 in a first step and larger than or equal to 20 in a second step. Then, screen display information corresponding to each of the steps is generated and the resolution of the application to be displayed may be changed according to each step.

The display control module 170 according to an embodiment may identify an available capacity value of the memory 130 of the electronic device 101, and receive an input signal for changing screen display information if the identified available capacity value is larger than or equal to a preset threshold capacity value. For example, the display control module 170 may identify an available capacity value of the application compared to the capacity value allocated to the memory 130. If the available capacity value of the application is larger than or equal to a preset threshold capacity value, the display control module 170 may receive an input signal for changing screen display information (such as, for example, a resolution). For example, if the user separately sets a threshold capacity (such as, for example, 60 MB, 100 MB etc.) or if the display control module 170 determines that the available capacity of the memory 130 is lacking (such as, for example, when the memory is lacking or a plurality of applications require excessive memory use according to execution of the applications), the display control module 170 may generate a signal for changing the screen display information.

The display control module 170 according to an embodiment may identify a battery state of the electronic device 101, and generate a signal for changing screen display information when the battery state reaches a preset battery state. The display control module 170 according to an embodiment may identify the battery state indicating a battery remaining capacity from a power management module 695. For example, when the battery state corresponds to 20% compared to a fully charged state (such as, for example, the battery is charged to 99% or above), the display control module 170 may reduce the resolution of the foreground application.

The display control module 170 according to an embodiment may generate a signal for changing screen display information which is created based on contents provided by the application. The display control module 170 according to an embodiment may identify at least one of a text information value of contents included in the application, an image information value, a video information value, and an information value related to a change in a resolution for each frame. For example, the controller can identify at least one of a text information value of content, an image information value of content, a video information value of content, and an information value related to the change in a resolution for each frame of content, the content being included in the application. If it is determined that at least one of the identified text information value, the image information value, the video information value, and the information value related to the change in the resolution for each frame is larger than or equal to a preset threshold content information value, the display control module 170 according to an embodiment may generate a control signal for changing screen display information. For example, the controller can generate the control signal for changing the screen display information if at least one of the text information value, the image information value, the video information value, and the information value related to the change in the resolution for each frame is larger than or equal to a preset threshold content information value.

The display control module 170 according to an embodiment may determine data load amounts included in text information, image information, and video information included in contents provided by the application (image information and video information requiring a high resolution if the number of texts is large). For example, the display control module 170 may determine information on the contents included in the application by using edge detection. The edge detection corresponds to a method which aims at identifying a pixel corresponding to an edge having discontinuities in image brightness. The edge is a feature indicating a boundary of areas in an image. Such a scheme may determine data load amounts included in text information by determining a boundary between text characters provided by the application. The display control module 170 may generate a signal for changing screen display information based on the determined information.

If it is determined that the number of pieces of text information is large or image information requires a high resolution, the display control module 170 according to an embodiment may change screen display information of the application. The display control module 170 may display the application based on the changed screen display information. For example, if a user interface displayed by a touch input event, a drag input event, a flip input event, or a flick input event of the user changes (such as, for example, when a page of a document changes or a displayed Internet page changes), the display control module 170 may determine content information (such as, for example, text information and image information) included in the changed user interface, change screen display information, and display the application.

The display control module 170 according to an embodiment may change screen display information and display the application according to a change in still screens (such as, for example, a picture screen and a text message screen), a change in a moving image (such as, for example, a dynamic image), and a change in text.

The display control module 170 according to an embodiment may determine a threshold content information value (such as, for example, frame rates of a previous screen and a current screen, change amounts, and complexity) and display screen display information. For example, the display control module 170 may determine to reduce a resolution of an application displayed if it is determined that change amounts and frame rates of the previous screen and the current screen correspond to a change amount and a frame rate larger than or equal to a preset reference (such as, for example, a reference designated by the user or a reference pre-stored by a developer, e.g., a frame rate of 10 FPS). In another example, if it is determined that screen complexity of contents is high, the display control module 170 may determine to reduce a resolution information value of the screen display information.

The display control module 170 according to an embodiment may make a control to store screen display information updated according to each application in the memory 130. If the display 150 receives an input event for executing an application, the display control module 170 may extract screen display information corresponding to the executed application from the memory 130 to determine the screen display information.

After generating a control signal for changing the screen display information, the display control module 170 according to an embodiment of the present disclosure may determine whether state information of the electronic device 101 changes. If the state information of the electronic device 101 changes, the display control module 170 according to an embodiment may generate a control signal for updating the changed screen display information based on the changed state information of the electronic device 101. The display control module 170 according to an embodiment may update the screen display information based on determination of a state information value of the electronic device 101, a threshold capacity value of the memory 130 (such as, for example, 50% charging compared to full charging), and a state (such as, for example, charging information) of a battery 1596 which are detected by one or more sensors included in a sensor module 1540.

For example, if the state of the battery 1596 of the electronic device 101 indicates the same charging amount (such as, for example, 99% charging compared to full charging) as that before the control signal for changing the screen display information is generated, the display control module 170 may generate the control signal again to update the changed screen display information to be the same as the screen display information before the control signal is generated.

The display control module 170 according to an embodiment of the present disclosure may make a control to divide a screen to display an application and a second application into two or more display areas. For example, the display 150 may receive an input event for executing the second application. The display control module 170 may divide a screen of the application corresponding to the received input event into two or more areas such as a first display area and a second display area and display the divided display areas.

The display control module 170 according to an embodiment of the present disclosure may determine screen display information of each of the two or more display areas. The display control module 170 according to an embodiment may control the display 150 to display execution screen of the application and the execution screen of the second application in the two or more display areas based on the determined screen display information, respectively.

The display control module 170 according to an embodiment of the present disclosure may generate a control signal for changing the screen display information based on determination of whether the display areas of the application and the second application are activated according to detection of a user input on the display areas. For example, the display 150 may display the application in the first display area and the second application in the second display area. If a user input for the application displayed in the first display area is detected, the display control module 170 may change the screen display information of the second display area. In an additional example, the display control module 170 may reduce a resolution value or a color depth value of the second display area where the user input is not detected.

The display control module 170 according to an embodiment of the present disclosure may generate a control signal for changing the screen display information based on contents provided by the application and the second application. The display control module 170 according to an embodiment may identify at least one of a text information value of contents included in each of the application and the second application, an image information value, a video information value, or an information value related to a change in a resolution for each frame.

The text information value may be a character string value or character bit value included in contents of each application. The image information value may be a capacity value of image data included in an image or a color depth information value included in the image. The video information value may be a capacity value of video data or a color depth information value of image data included in a video. The information value related to the change in the resolution for each frame may be an information value related to a change in a resolution (i.e., having a unit defined by pixels) of an image.

If it is determined that at least one of the identified text information value, the image information value, the video information value, or the information value related to the change in the resolution for each frame is larger than or equal to a preset threshold content information value, the display control module 170 according to an embodiment of the present disclosure may generate a control signal for changing screen display information.

For example, if it is determined that the identified text information value is larger than or equal to a preset threshold content information value (such as, for example, a character string bit value displayed on a screen corresponds to 600 bits), the display control module 170 may increase a resolution of a displayed image (such as, for example, an application). In an additional example, if the identified information value related to the change in the resolution for each frame is larger than or equal to a preset threshold content information value (such as, for example, 100*100 per second or width*height, and a change in the number of pixels), the display control module 170 may reduce a resolution of an image.

The display control module 170 may determine a resolution based on a result of determination of whether a measured rendering time is exceeded. If the measured rendering time exceeds a preset vertical synchronization time interval of the display 150, the display control module 170 according to an embodiment may determine a resolution having an interval (e.g., "fps") which can be supported by the display 150. For example, the display control module 170 may identify a maximum interval (e.g., "fps") which can be supported by the display 150 based on data (such as, for example, text data, image data, or screen switching data for each frame) included in the displayed application.

The display control module 170 may render the application based on the resolution determined based on the identified interval (fps). The display control module 170 according to an embodiment may increase the size of the rendered application through a scaler and make a control to display the increased application on the screen.

The display control module 170 according to an embodiment of the present disclosure may acquire type information of displays classified according to functions or sizes provided by the display 150. For example, the classification of the displays may be related to devices which can only make a display based on display information received by the electronic device 101 and devices including only a controller and display unit related to image generation.

The display control module 170 according to an embodiment may acquire brightness information of the display 150, rendering computation information of the processor 120, resolution information of the display 150, and information on the number of frames per second (fps) of the screen displayed on the display 150. The rendering computation information may be information related to a time which can be calculated per frame.

The display control module 170 according to an embodiment may acquire power saving mode application information of the display 150, heating information of the display 150, and current consumption information of the display 150. The power saving mode application information may be information related to controlling a resolution set by the user, controlling brightness, and controlling an activation time for a preset time. For example, different pieces of power saving mode application information may be applied according to applications.

The display control module 170 according to an embodiment may acquire ambient brightness information detected by at least one sensor. The display control module 170 according to an embodiment may acquire brightness information of the electronic device 101 through at least one sensor (such as, for example, an illumination sensor 1540K) included in the sensor module 1540.

The display control module 170 according to an embodiment may determine color depth information based on the acquired information. The display control module 170 according to an embodiment may generate screen display information based on the determined color depth information. The display control module 170 according to an embodiment may display an application based on the generated screen display information.

If it is determined that power consumption of the electronic device 101 is larger than or equal to 80%, the display control module 170 according to an embodiment may determine a color depth of 32 bits. If it is determined that power consumption of the electronic device 101 is larger than or equal to 50% and smaller than 80%, the display control module 170 according to an embodiment may determine a color depth of 24 bits. If it is determined that power consumption of the electronic device 101 is larger than or equal to 20% and smaller than 50%, the display control module 170 according to an embodiment may determine a color depth of 16 bits. If it is determined that power consumption of the electronic device 101 is smaller than 20%, the display control module 170 according to an embodiment may determine a color depth of 8 bits. The display control module 170 may generate screen display information based on the determined color depth and display an application (such as, for example, an image or a video) based on the generated screen display information.

If it is determined that a temperature value of the electronic device 101 is larger than or equal to a preset temperature value (such as, for example, 20 degrees on a particular temperature scale), the display control module 170 according to an embodiment may reduce a color depth.

The display control module 170 according to an embodiment may determine to use a color depth of 32 bits if a preset condition (such as, for example, a temperature value, rendering computation, or resolution) is met, and determine to use a color depth of 16 bits when the preset condition is not met.

If the number of frames per second (or "FPS") is equal to or smaller than a preset threshold FPS (such as, for example, 40 fps or 30 fps), the display control module 170 according to an embodiment may determine to use the color depth of 32 bits. If the FPS is larger than or equal to a preset threshold FPS (such as, for example, 40 fps or 30 fps), the display control module 170 may determine to change the color depth of 32 bits into the color depth of 24 bits.

The display control module 170 according to an embodiment may determine the color depth based on an ambient brightness value of the electronic device 101. For example, if the ambient brightness value of the electronic device 101 is larger than or equal to a preset threshold brightness value (such as, for example, 30 lux or 40 lux), the display control module 170 may determine to use the color depth of 32 bits. If the ambient brightness value of the electronic device 101 is smaller than a preset threshold brightness value (such as, for example, 30 lux or 40 lux), the display control module 170 may determine to use the color depth of 16 bits.

The display control module 170 according to an embodiment may set different color depths according to applications. For example, the display control module 170 may analyze an image included in the application if the application is installed. The display control module 170 may identify a frequency (such as, for example, a ratio of RGB or a use frequency of R, G, and B of RGB) of the color depth included in the application. For example, if it is determined that an application uses the color depth of 32 bits, the display control module 170 may control the display 150 to display the application with the color depth of 32 bits if the application is executed.

If a memory use value is equal to or smaller than a preset threshold memory use value (such as, for example, 50% or 40%), the display control module 170 according to an embodiment may reduce the color depth.

The display control module 170 according to an embodiment may receive state information of another electronic device (such as, for example, the electronic device 102 or 104) from the other electronic device through the communication interface 160. The display control module 170 according to an embodiment may determine color depth information based on the received state information of the other electronic device (such as, for example, the electronic device 102 or 104). The display control module 170 according to an embodiment may generate screen display information based on the determined color depth information.

The state information of the other electronic device (such as, for example, the electronic device 102 or 104) may be at least one piece of current consumption information of the other electronic device (such as, for example, the electronic device 102 or 104), temperature information, information on a power saving mode, power information corresponding to the executed application, screen size information of the other electronic device, brightness information, Frame Per Second (or "FPS") information, resolution information, and rendering computation information.

The communication interface 160 according to an embodiment may transmit the generated screen display information to the other electronic device (such as, for example, the electronic device 102 or 104).

FIGS. 2A, 2B, 2C, and 2D schematically illustrates an example operation of controlling a display of an application by the electronic device 101 according to various embodiments of the present disclosure.

The display control module 170 according to an embodiment may display an application based on at least one piece of information on a position where the application is displayed, size information of the application, scale information to enlarge the application, and resolution information of the application.

Referring to FIG. 2A, the display control module 170 may determine a lower left side of an entire screen 200 as a position of an application A 201, and determine size information corresponding to ¼ of the entire screen 200 and resolution information (such as, for example, T42 or T85). If the determined scale value to enlarge the application A 201 is 4, the display control module 170 may scale up the application A 201 and make a control to display the application A 201 in the entire screen.

Figure 2B:
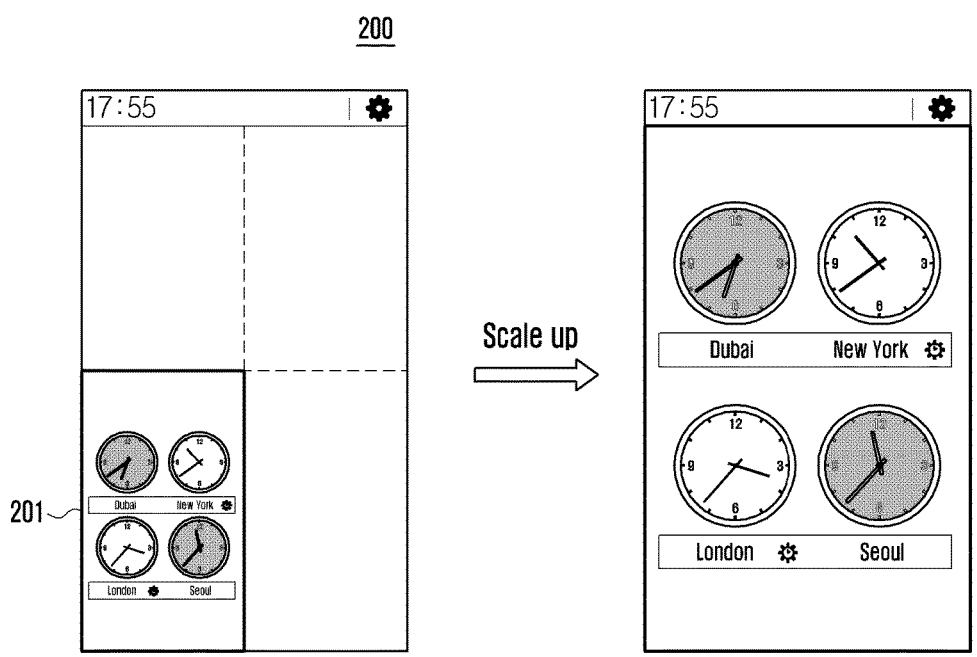

Referring to FIG. 2B, the display control module 170 may determine a screen position of the application 201 compared to the entire screen 200, size information, resolution information, and scale information. The display control module 170 may display the application 201 based on the determined screen position, size information, resolution information, and scale information. The display control module 170 may make a control to scale up the displayed application 201 based on the scale information and display the scaled up application 201.

Figure 2C:
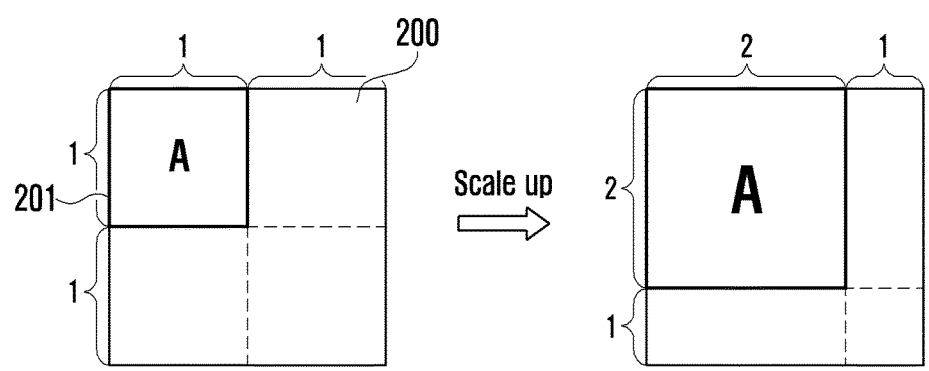

Referring to FIG. 2C, the display control module 170 may determine an upper left side of the entire screen 200 as a position of the application A 201, and determine size information corresponding to ¼ of the entire screen 200 and resolution information (such as, for example, T42 or T85). If the determined scale value to enlarge the application A 201 is 16/9, the display control module 170 may scale up the application A 201, change the application A 201 into 4/9 of the entire screen, and display the changed application A 201. The information on the position where the application is displayed, the size information of the application, the scale information to enlarge the application, and the resolution information of the application may change.

Figure 2D:
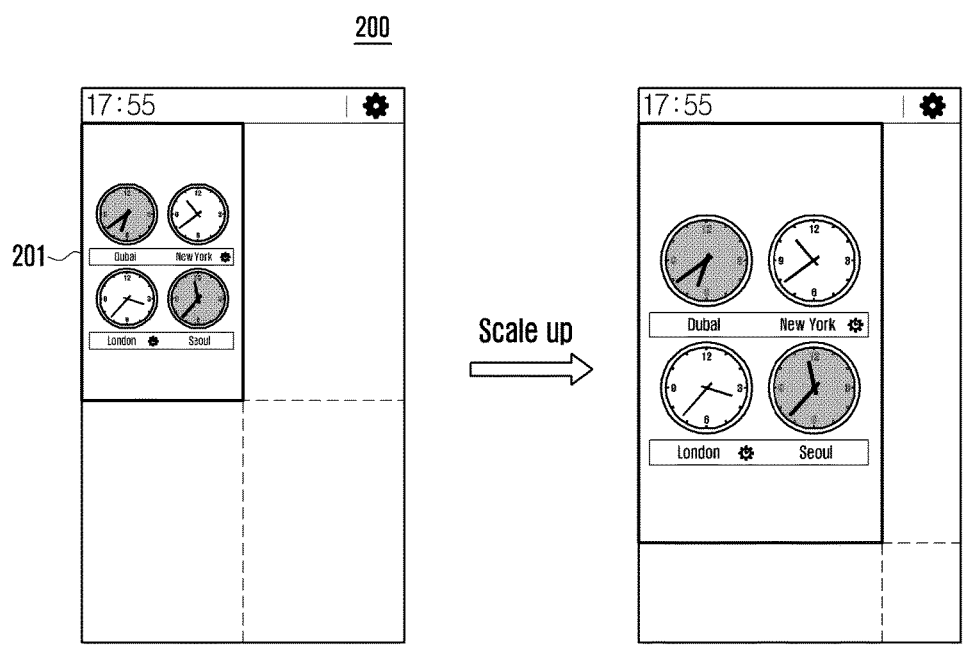

Referring to FIG. 2D, the display control module 170 may determine a screen position of the application 201 compared to the entire screen 200, size information, resolution information, and scale information. The display control module 170 may display the application 201 based on the determined screen position, size information, resolution information, and scale information. The display control module 170 may make a control to scale up the displayed application 201 based on the scale information and display the scaled up application 201.

Figure 3:
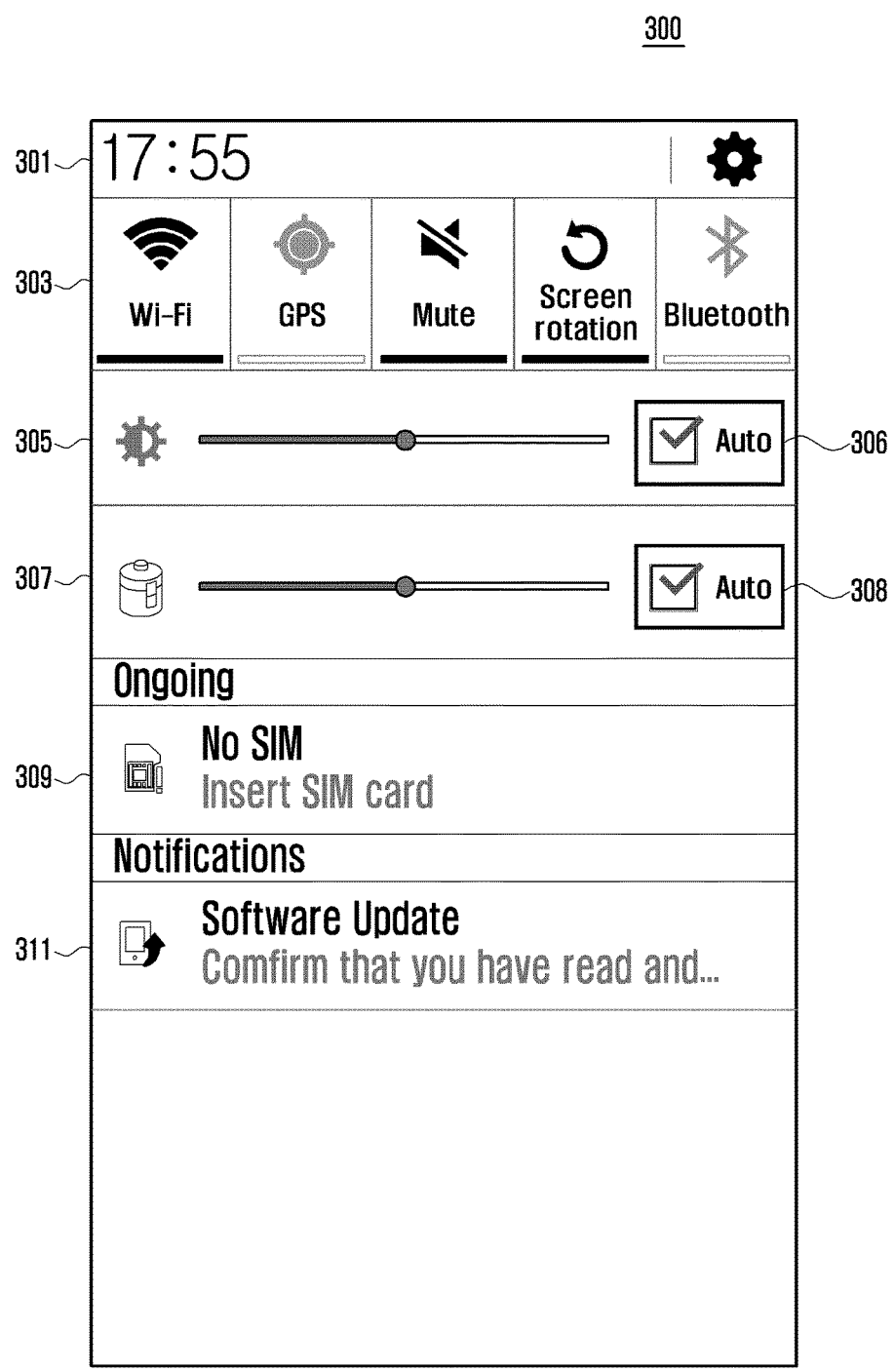
FIG. 3 schematically illustrates an example operation for controlling a display of an application by an electronic device according to various embodiments of the present disclosure.

FIG. 3 schematically illustrates an operation for controlling a display of an application by the electronic device according to an embodiment of the present disclosure.

The display 150 according to an embodiment of the present disclosure may display a screen 300. The display 150 may include at least one of a date control UI 301, a group selection UI 303, a brightness control UI 305, a resolution control UI 307, an interface information UI 309, or a notification UI 311. The date control UI 301 may display year, month, day, and time, and the group selection UI 303 may display a group for providing functions of controlling Wi-Fi, GPS, sound, screen rotation, and Bluetooth. The brightness control UI 305 may be a user interface for providing a function of controlling brightness of the display 150. The brightness control UI 305 may include a brightness auto UI 306, and the brightness auto UI 306 may provide a function of storing and using brightness finally selected by a user or system.

The resolution control UI 307 may be a user interface for providing a function of controlling a resolution of an application displayed on the display 150. The resolution control UI 307 may control a resolution of an application to be displayed, by using a slide bar. The resolution control UI 307 may include a resolution auto UI 308, and the resolution auto UI 308 may provide a function of storing and using a resolution finally selected by a user or system. The interface information UI 309 may provide a function of providing information on whether a SIM card is inserted, and the notification UI 311 may provide a notification of software update.

Figure 4:
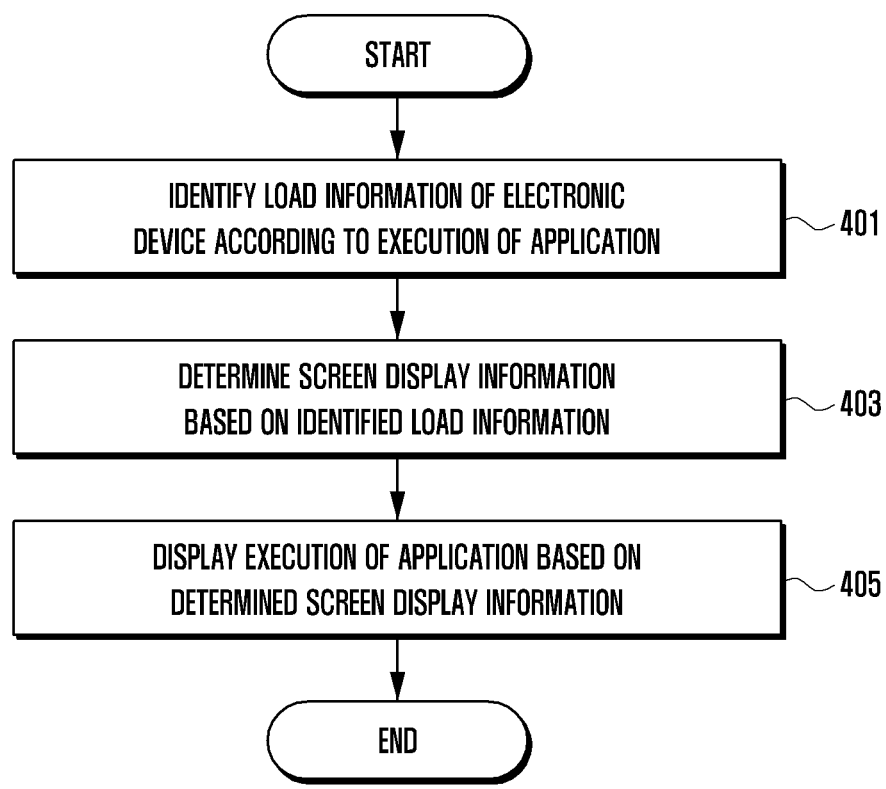
FIG. 4 is a flowchart illustrating an example operation for displaying an application by an electronic device according to various embodiments of the present disclosure.

FIG. 4 is a flowchart illustrating an example operation of displaying an application by the electronic device 101 according to various embodiments of the present disclosure.

The electronic device 101 may receive an input signal for executing an application. For example, the display 150 may receive an input event for executing an application or receive a signal for making a request for executing an application from an external device (such as, for example, another electronic device 102 or 104) connected through the communication interface 160 over physical network connection or wireless network connection. The processor 120 may execute the application based on the input signal received from the external device.

The display control module 170 may identify load information of the electronic device according to the execution of the application in operation 401. The load information of the electronic device 101 according to an embodiment may include memory capacity information of the electronic device 101, temperature information, battery consumption information, and power use information of the electronic device 101. The load information may be pre-stored information or may be predicted by the display control module 170 by determining a required specification of the corresponding application (e.g., required capacity, resolution, supported operating system (e.g., Android, or iOS) according to the execution of the application.

The display control module 170 may determine screen display information based on the identified load information in operation 403. The display control module 170 may display the application based on the determined screen display information in operation 405. The screen display information may include at least one piece of information on a position where the application is displayed, information on a size of the application, scale information of the application to be enlarged, resolution information of the application, and color depth information of the application.

The display control module 170 according to an embodiment may determine screen display information by determining a power use amount of the electronic device 101, a memory use level, and a load degree of system resources. For example, if an available memory capacity value of the application to be executed is equal to or smaller than a preset threshold capacity value (such as, for example, 100 MB), the display control module 170 may change the screen display information (by, for example, reducing a resolution) and display the application.

Figure 5:
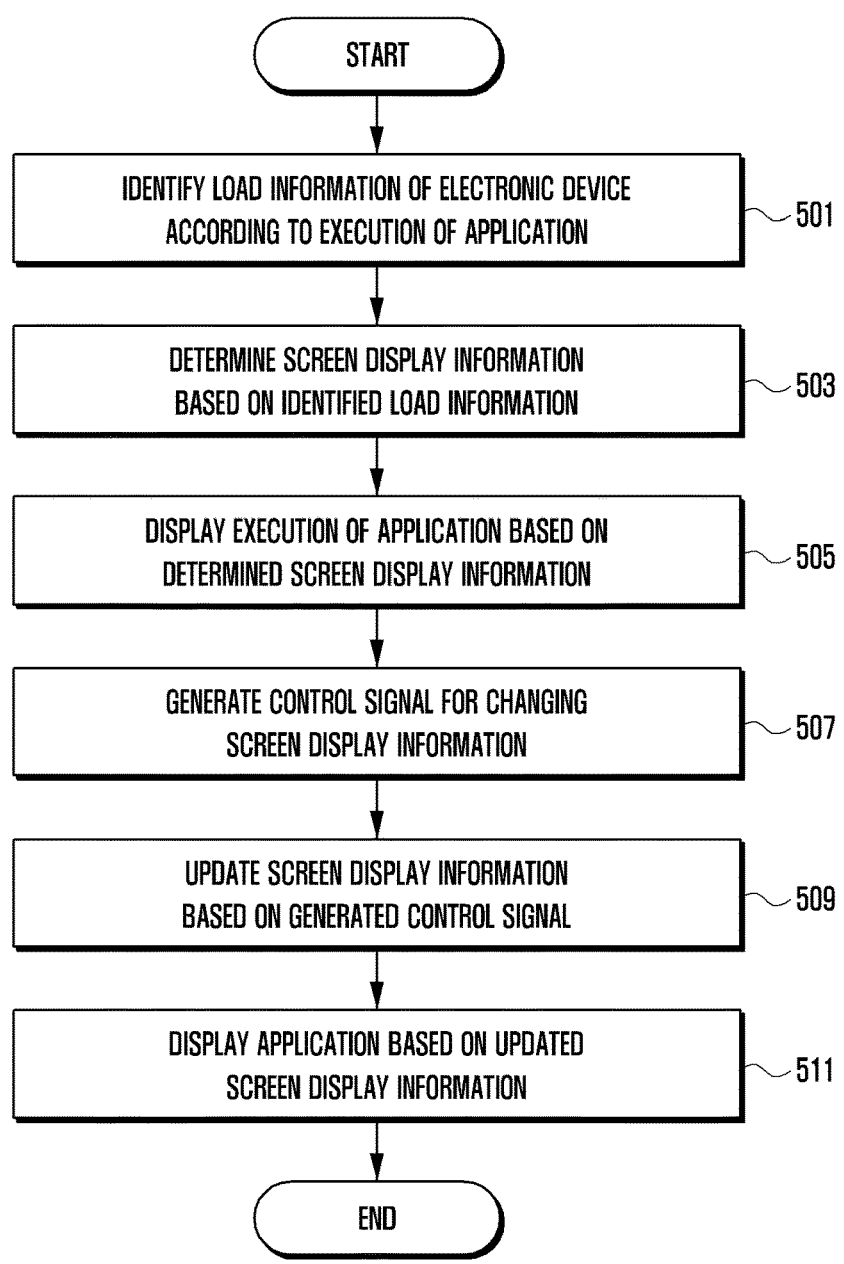
FIG. 5 is a flowchart illustrating an example operation for displaying an application by an electronic device according to various embodiments of the present disclosure.

FIG. 5 is a flowchart illustrating an example operation of displaying an application by the electronic device according to various embodiments of the present disclosure.

The electronic device 101 may receive an input signal for executing an application. For example, the display 150 may receive an input event for executing an application or receive a signal for making a request for executing an application from an external device (such as, for example, another electronic device 102 or 104) connected through the communication interface 160 over physical network connection or wireless network connection. The processor 120 may execute the application based on the input signal received from the external device.

The display control module 170 may identify load information of the electronic device according to the execution of the application in operation 501. The load information of the electronic device 101 according to an embodiment may include memory capacity information of the electronic device 101, temperature information, battery consumption information, and power use information of the electronic device 101. The load information may be pre-stored information or may be predicted by the display control module 170 by determining a required specification of the corresponding application (such as, for example, required capacity, resolution, supported operating system (such as, for example, Android, or iOS) according to the execution of the application.

The display control module 170 may determine screen display information based on the identified load information in operation 503. The display control module 170 may display the application based on the determined screen display information in operation 505. The screen display information may include at least one piece of information on a position where the application is displayed, information on a size of the application, scale information of the application to be enlarged, resolution information of the application, and color depth information of the application. The display control module 170 according to an embodiment may determine screen display information by determining a power use amount of the electronic device 101, a memory use level, and a load degree of system resources. For example, if an available memory capacity value of the application to be executed is equal to or smaller than a preset threshold capacity value (such as, for example, 100 MB), the display control module 170 may change the screen display information (such as, for example, reduce a resolution) and display the application.

The display control module 170 may generate a control signal for changing screen display information in operation 507. The display control module 170 according to an embodiment may identify a temperature value of the electronic device 101 from at least one sensor, and generate a control signal for changing the screen display information if the temperature value is larger than or equal to a preset threshold temperature value. The display control module 170 according to an embodiment may identify an available memory capacity value (such as, for example, an available capacity against a rated capacity of the memory) of the electronic device 101, and generate a control signal for changing the screen display information if the available capacity value is equal to or smaller than a preset threshold capacity value. The display control module 170 according to an embodiment may identify a battery state of the electronic device 101, and generate a signal for changing the screen display information if the battery state reaches a preset battery state.

The display control module 170 may update the screen display information based on the generated control signal in operation 509. The display control module 170 may display an application based on the updated screen display information in operation 511. The screen display information may include at least one piece of information on a position where the application is displayed, information on a size of the application, scale information of the application to be enlarged, and resolution information of the application.

The display control module 170 according to an embodiment may determine screen display information (e.g., a resolution), execute rendering according to a virtual resolution according to a virtual resolution which is a resolution determined by the screen display information, and change the size of the application through image processing module such as surface flinger. The rendering may refer to a process of making an image from a model file (or a scene including gathered models). The surface flinger may provide a function of outputting an execution screen of the application to the display 150. For example, the surface flinger may complexly use techniques such as page flipping, layer combination, OpenGL, ES, and EGL.

Since the rendering is not required according to an original resolution of the screen and a memory space suitable for the original resolution is not needed, the display control module 170 may acquire an effect of reduction in the memory and current. Referring to [Table 1], in a case of a home screen or a live wallpaper, it is noted that a memory use amount is reduced to 47.8 MB from 113.2 MB. In a case of an application such as home screen, wallpaper, simple activity with a list view, OpenGL, game (such as, for example, "Hill Climb Racing"), or GFX bench (such as, for example, "Manhattan test"), it is noted that the memory use amount is also reduced.

TABLE 1

|  | Application | |
|---|---|---|
|  | No Scaling | Scaling |
| Application | Memory usage (unit: MB) | |
| Home screen, live wallpaper | 113.2 | 47.8 |
| Home screen, static wallpaper | 92.7 | 44.9 |
| Simple activity with a list view | 121.5 | 44.9 |
| OpenGL, Game | 123.7 | 50.9 |
| GFX Bench | 128.8 | 55.1 |

Referring to [Table 2], it is noted that energy consumption is reduced to 54 joules (a unit of energy) from 60 joules when applications such as a simple activity with a list view and scroll up/down are simply used. In a case of applications such as a game (such as, for example, a known game such as "Angry Birds," "Temple Run 2," "Fruit Ninja," or "Fruit Ninja" operated without touch inputs), a web-browser (such as "Google Chrome"), a performance bench mark utility such as "GL Benchmark 2.5", it is noted that energy consumption is also reduced.

TABLE 2

|  | Application | |
|---|---|---|
|  | No Scaling | Scaling |
|  | Energy consumption (unit: joule (J)), | |
| Application | reduction unit (%) | |
| Simple activity with a list view, scroll up/down for 45 seconds | 60 | 54 (10%) |
| Play a game (for example, Angry Birds) for 125 seconds | 200 | 190 (5%) |
| Use a Google Chrome browser for 90 seconds | 181 | 160 (12%) |
| Use GL Benchmark 2.5 for 120 seconds | 484 | 370 (24%) |
| Play a game (for example, Temple Run 2) for 120 seconds | 184 | 152 (18%) |
| Play a game (for example, Fruit Ninja) for 60 seconds | 103 | 93 (10%) |
| Play a game (for example, Fruit Ninja) for 60 seconds without any touch input | 77 | 63 (19%) |

Figure 6A:
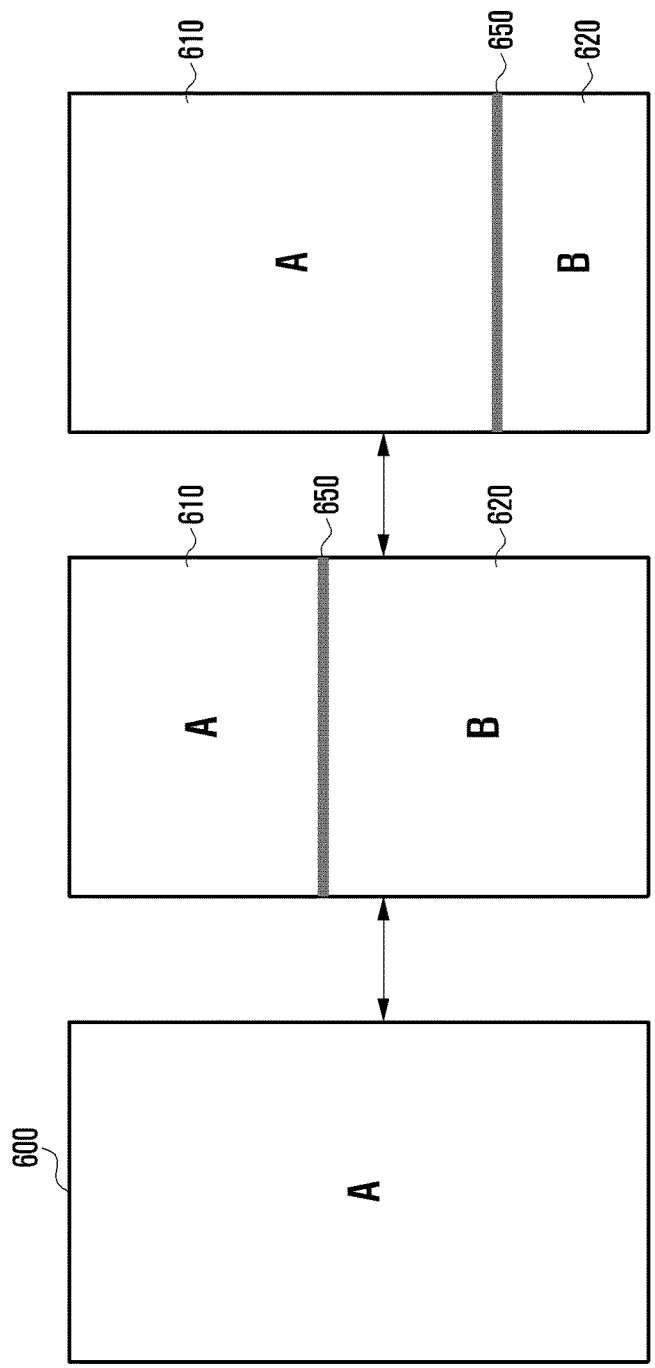
FIG. 6A, FIG. 6B and FIG. 6C schematically illustrate an example UI for displaying different pieces of screen display information according to applications displayed on a screen of an electronic device according to various embodiments of the present disclosure.
Figure 6B:
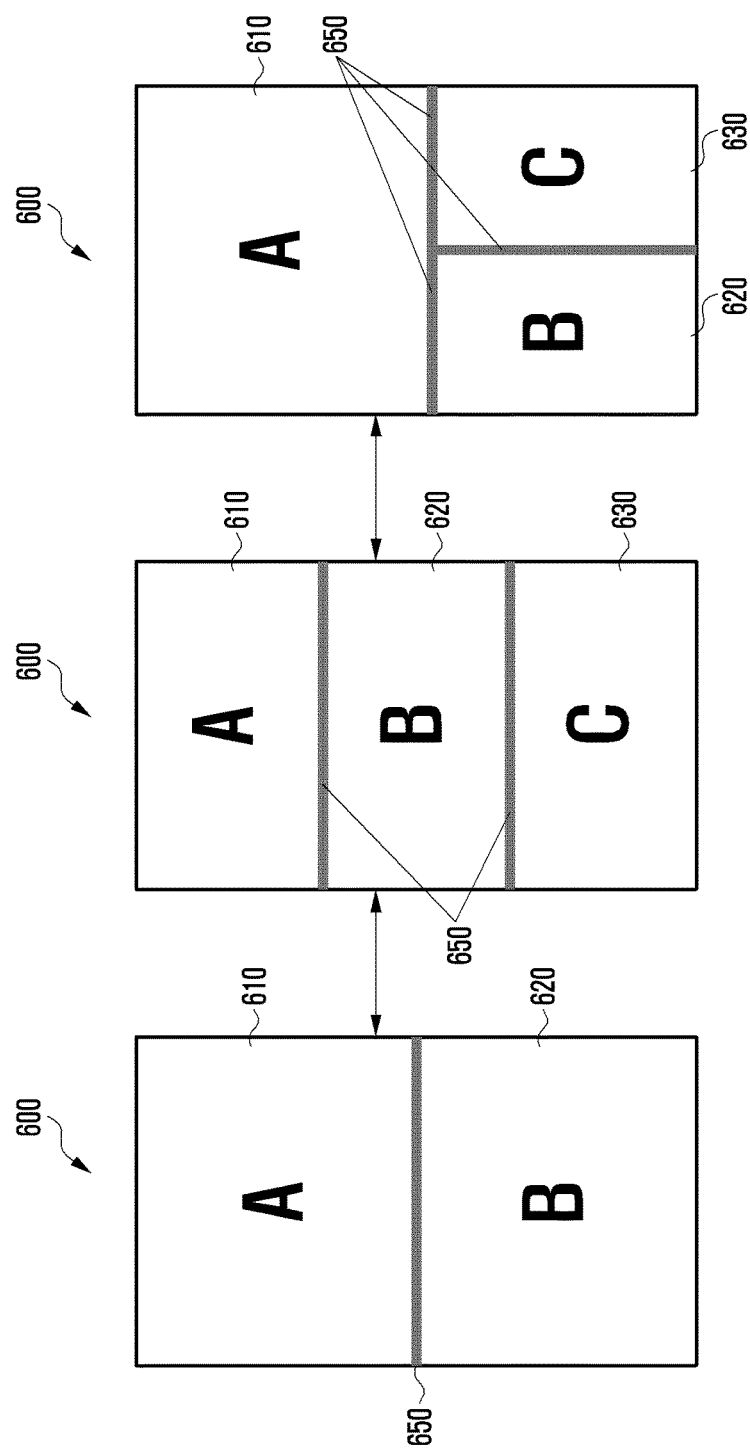
Figure 6C:
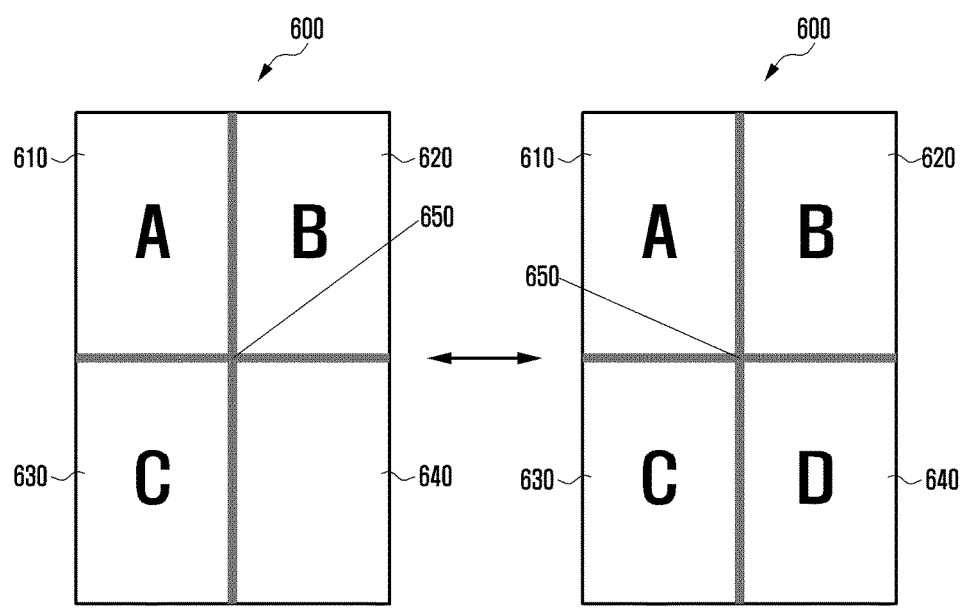

FIGS. 6A to 6C schematically illustrate a UI for displaying different pieces of screen display information according to applications displayed on the screen of the electronic device 101 according to various embodiments of the present disclosure.

Referring to FIG. 6A, a screen 600 according to various embodiments of the present disclosure may include a separator 650 for supporting a control of sizes of at least two display areas. Navigations, scrolls, and text inputs according to execution applications may be independently implemented in the display areas divided from the screen 600. Predetermined display areas of the display areas may be referred to as a first display area 610 and a second display area 620. The screen 600 according to various embodiments may include a pop-up window including a separate interface (e.g., a memo interface or an interface).

Although FIG. 6A illustrates that the screen of the electronic device 101 is divided into two execution areas (or display areas) through one separator 650. According to an embodiment of the present disclosure, the screen may be maximally divided into N (e.g., N is a natural number>1) in proportion to the size of the screen according to an embodiment of the present disclosure. Accordingly, the number of separators 650 may be one or more in accordance with the number of screens to be divided, that is, a division type of the screen 600. The divided display areas may be referred to as the first display area 610 and the second display area 620.

For example, when the screen is divided into two execution areas as illustrated in FIG. 6A, the areas may be controlled by one separator 650. When the screen is divided into three execution areas, the areas may be controlled by two separators 650. When the screen is divided into four execution areas, the areas may be controlled by two or three separators 650.

As illustrated in FIG. 6A, the display 150 may display the application A in an entire screen. FIG. 6A illustrates an example of the screen of the electronic device 101 when the electronic device 101 executes two applications through screen 600. For example, the user may additionally execute an application B in a state where an entire screen of the application A is displayed. The display 150 may divide one screen into two display areas corresponding to independent display areas through the separator 650, and provide screens of the application A and the application B through the display areas, respectively. For example, the display 150 may display the application A in the first display area 610 and the application B in the second display area 620. As described above, a plurality of application according to the division of the screen into at least two screens according to an embodiment of the present disclosure may be simultaneously controlled.

The display control module 170 according to an embodiment of the present disclosure may determine whether there is a user input for the application A displayed in the first display area 610 and the application B displayed in the second display area 620. When the user input for the first display area is detected, the display control module 170 according to an embodiment may change screen display information (such as, for example, resolution information, brightness information, or color depth information) of the second display area 620 in which the application B is displayed. For example, when an input event for the first display area 610 displaying the application A is detected, the display control module 170 may reduce a resolution value, a brightness value, and a color depth value of the second display area 620.

The display control module 170 according to an embodiment of the present disclosure may generate a control signal for changing the screen display information based on contents provided by the application A and the application B. The display control module 170 according to an embodiment may identify at least one of a text information value of contents included in the application A or the application B, an image information value, a video information value, or an information value related to a change in a resolution for each frame.

When it is determined that at least one of the identified text information value, the image information value, the video information value, or the information value related to the change in the resolution for each frame is larger than or equal to a preset threshold content information value, the display control module 170 may generate a control signal for changing screen display information. For example, when a video application is executed in the second display area 620, if a change in the resolution for each frame included in the video application is larger than or equal to 20% against the entire screen, the display control module 170 may reduce the resolution of the video application.

Referring to FIG. 6B, the display 150 according to an embodiment of the present disclosure may display a screen displayed when the application A, the application B, and an application C are executed in three display areas through two separators 650. For example, the display 150 may display the application A in the first display area 610, the application B in the second display area 620, and the application C in a third display area 630.

The display control module 170 according to an embodiment of the present disclosure may determine whether there is a user input for the application A displayed in the first display area 610, the application B displayed in the second display area 620, and the application C displayed in the third display area 630. When the user input for the first display area is detected, the display control module 170 according to an embodiment may change screen display information (e.g., resolution information, brightness information, or color depth information) of the second display area 620 in which the application B is displayed and the third display area 630 in which the application C is displayed. For example, when an input event for the first display area 610 displaying the application A is detected, the display control module 170 may reduce resolution values, brightness values, and color depth values of the second display area 620 and the third display area 630.

The display control module 170 according to an embodiment of the present disclosure may generate a control signal for changing the screen display information based on contents provided by the application A and the application B. The display control module 170 according to an embodiment may identify at least one of a text information value of contents included in the application A, the application B, and the application C, an image information value, a video information value, or an information value related to a change in a resolution for each frame.

When it is determined that at least one of the identified text information value, the image information value, the video information value, and the information value related to the change in the resolution for each frame is larger than or equal to a preset threshold content information value, the display control module 170 may generate a control signal for changing the screen display information.

For example, the display control module 170 may display a memo application in the first display area 610, a date application in the second display area 620, and a 3D game application in the third display area 630. The display control module 170 according to an embodiment may increase the resolution of the third display area 630 in which the 3D game application is displayed, and reduce the resolutions of the first display area 610 and the second display area 620. The control (e.g., increase or reduction) of the screen display information (e.g., resolution information, brightness information, and color depth information) may be changed or updated.

Referring to FIG. 6C, the display 150 according to an embodiment of the present disclosure may display the application A, the application B, and the application C in four display areas. The display 150 may display one of the display areas as an empty display area in which no application is executed. The display 150 may display a screen displayed when applications are executed in the divided four display areas through a plurality of separators 650.

The display 150 according to an embodiment of the present disclosure may display the application A, the application B, the application C, and an application D in the four display areas. One display area may be set as an empty display area by a user's designation. The screen shown when applications are executed in the four display areas divided through the plurality of separators 650 may be displayed.

The display 150 according to an embodiment of the present disclosure may display a screen in which a video is reproduced in the first display area 610, a screen in which a Social Network Service (SNS) is executed in the second display area 620, an execution screen related to an e-book function in the third display area, and an Internet news execution information in a fourth display area 640, and a final touch input event may be detected in the screen of the e-book in the third display area 630.

The display control module 170 according to an embodiment may increase the resolution of the third display area 630, and reduce the resolutions of the first display area 610, the second display area 620, and the fourth display area 640. A control degree of the resolution may change, and the increase and reduction in the resolution may change.

When an image information value (e.g., a pixel value such as a unit defined in number of pixels in width by height) required by the application displayed in the first display area 610 is larger than an image information value of the applications displayed in the second display area 620, the third display area 630, and the fourth display area 640, the display control module 170 according to an embodiment of the present disclosure may increase the brightness and color depth of the application displayed in the first display area 610.

Figure 7:
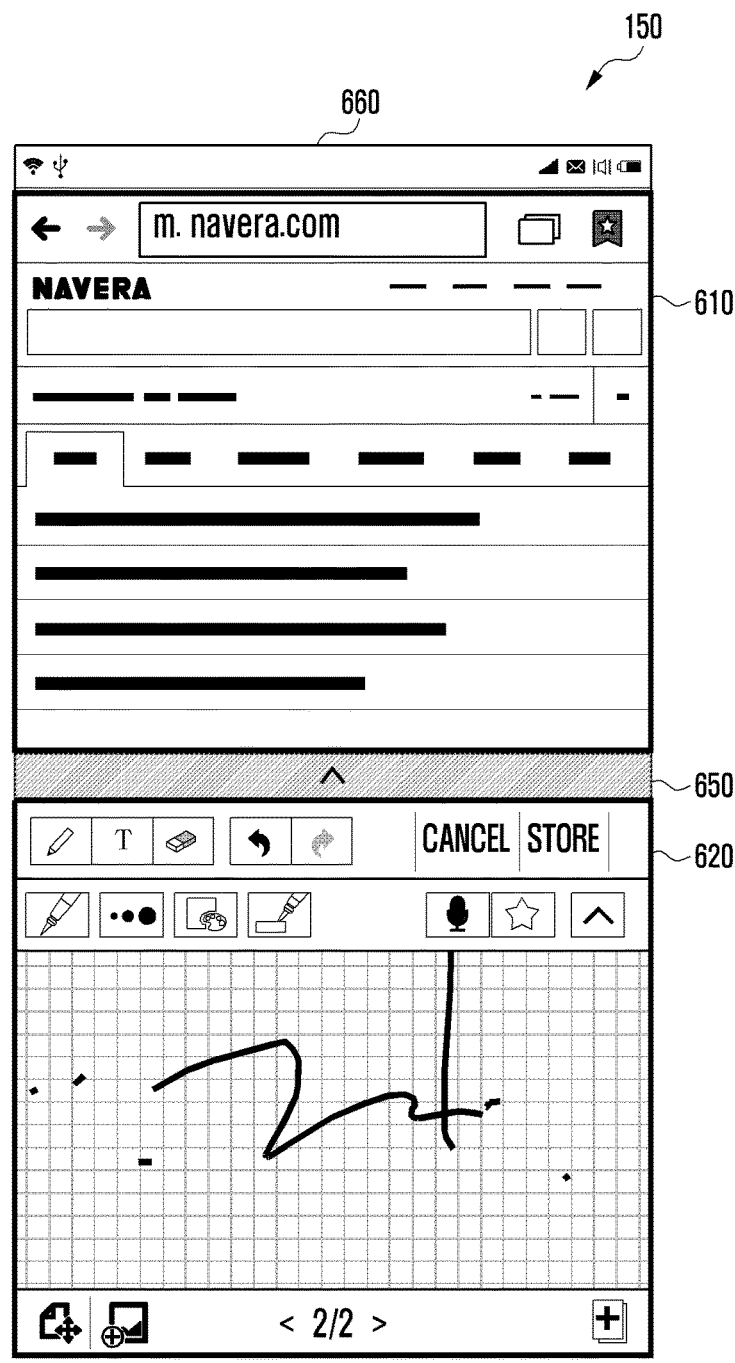
FIG. 7 schematically illustrates an example UI for displaying different pieces of screen display information according to applications displayed on a screen of an electronic device according to various embodiments of the present disclosure.

FIG. 7 schematically illustrates an example UI for displaying different pieces of screen display information according to applications displayed on the screen of the electronic device 101 according to various embodiments of the present disclosure.

Referring to FIG. 7, the display 150 may display a plurality of applications in display areas (e.g., the first display area 610 and the second display area 620), respectively.

The display control module 170 according to an embodiment of the present disclosure may determine whether there is a user input for an Internet application displayed in the first display area 610 and a memo application displayed in the second display area 620. When the user input for the first display area 610 is detected, the display control module 170 may change screen display information (e.g., such as resolution information, brightness information, or color depth information) of the second display area 620 in which the memo application is displayed. For example, when an input event for the first display area 610 displaying the Internet application is detected, the display control module 170 may reduce a resolution value, a brightness value, and a color depth value of the second display area 620.

When it is determined that an image information value (such as, for example, a pixel value) required by the Internet application displayed in the first display area 610 and a text information value (e.g., a text data value included in Internet such as, for example, a text character bit value) are larger than those of the memo application displayed in the second display area 620, the display control module 170 may increase the resolution and brightness of the Internet application displayed in the first display area 610 and reduce the resolution and brightness of the memo application displayed in the second display area 620.

Figure 8:
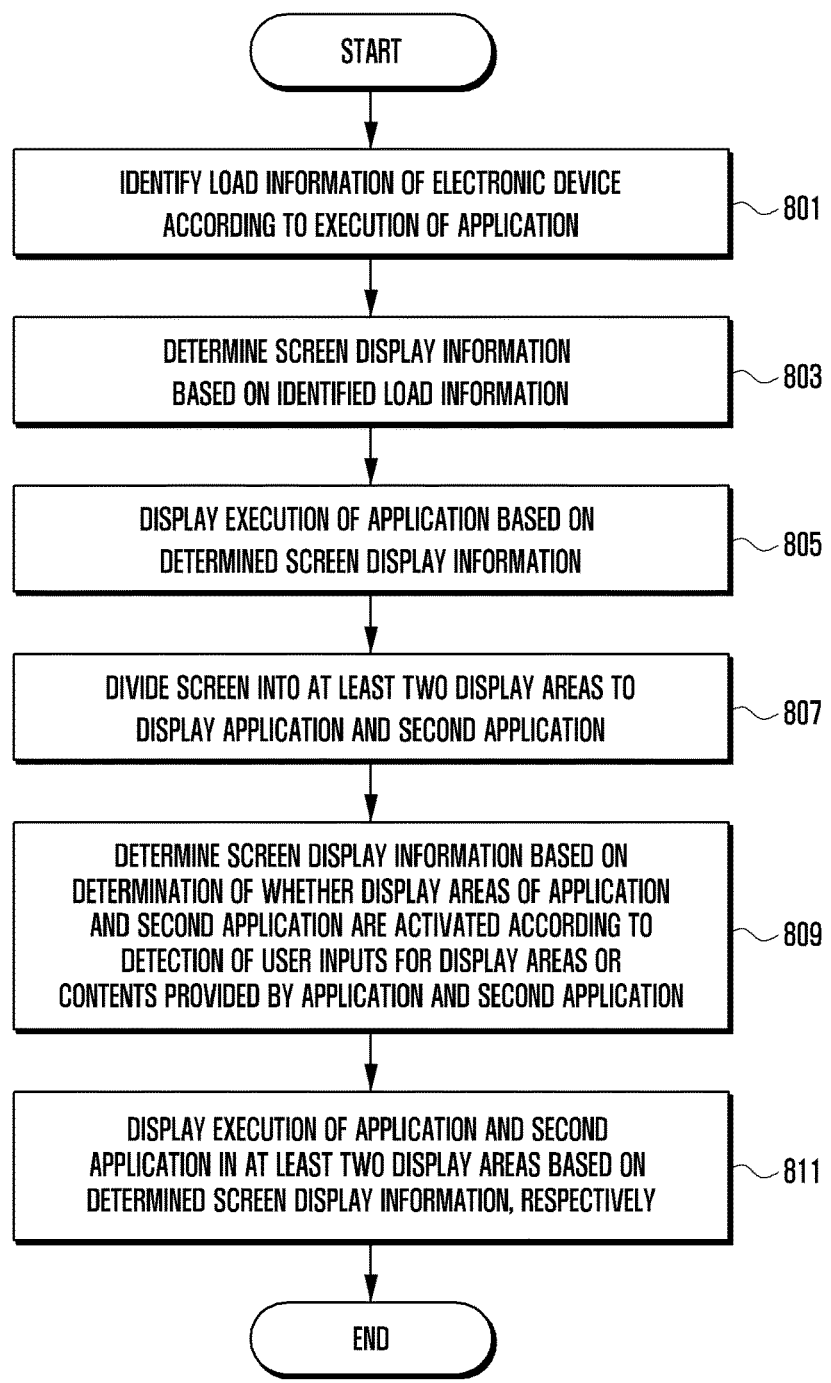
FIG. 8 is a flowchart illustrating an example operation for displaying different pieces of screen display information according to applications displayed on a screen of an electronic device according to various embodiments of the present disclosure.

FIG. 8 is a flowchart illustrating an example operation for displaying different pieces of screen display information according to applications displayed on the screen of the electronic device 101 according to various embodiments of the present disclosure.

The electronic device 101 may receive an input signal for executing an application. For example, the display 150 may receive an input event for executing an application or receive a signal for making a request for executing an application from an external device (such as, for example, another electronic device 102 or 104) connected through the communication interface 160 over physical network connection or wireless network connection. The processor 120 may execute the application based on the input signal received from the external device.

The display control module 170 may identify load information of the electronic device according to the execution of the application in operation 801. The display control module 170 may determine screen display information based on the identified load information in operation 803. The display control module 170 may display the application based on the determined screen display information in operation 805.

The electronic device 101 may receive an input signal for executing the application. For example, the display 150 may receive an input event for executing a second application or receive a signal for making a request for executing the second application from an external device (such as, for example, another electronic device 102 or 104) connected through the communication interface 160 over physical network connection or wireless network connection. The processor 120 may execute the application based on the input signal received from the external device. The electronic device 101 according to an embodiment may receive a request signal for dividing the screen into at least two display areas.

The display control module 170 may divide the screen into at least two display areas in operation 807 to display the application and the second application. For example, the display control module 170 may control the display 150 to display the screen, including a multi window display.

The display control module 170 may determine screen display information based on determination of whether the display areas of the application and the second application are activated according to detection of a user input for the display areas or contents provided by the application and the second application in operation 809. For example, the display control module 170 may reduce the resolution and brightness of the display area where no user input is detected. In an additional example, when a pixel value and a change value of a resolution for each frame included in the first display area displaying the application are larger than those of the second display area displaying the second application, the display control module 170 may reduce the brightness and resolution of the second display area displaying the second application.

The display control module 170 may display execution of the application and the second application in at least two display areas based on the determined screen display information in operation 811. It is understood that one or more of the operations may be added or omitted, including one or more of operations 801 to 807.

Figure 9:
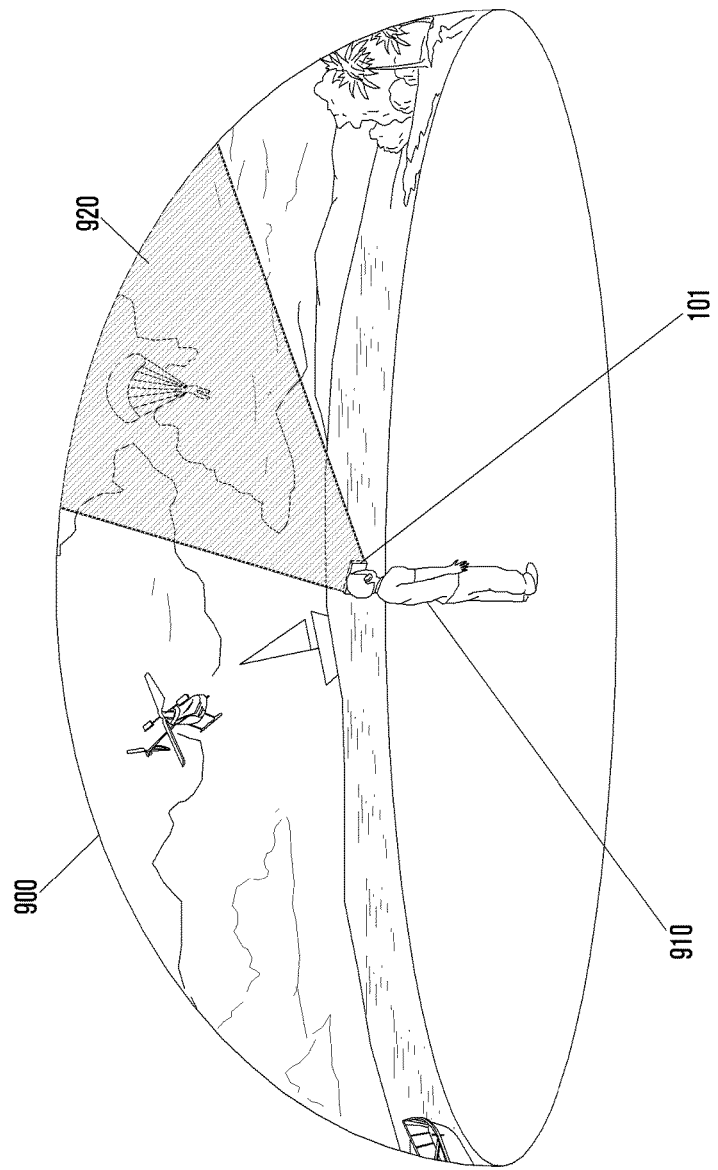
FIG. 9 schematically illustrates an example of displaying an application in the form of virtual object by an electronic device according to various embodiments of the present disclosure.

FIG. 9 schematically illustrates an example of displaying an application in the form of virtual object by the electronic device 101 according to various embodiments of the present disclosure.

The electronic device 101 according to an embodiment of the present disclosure may be a wearable device (such as, for example, a Head-Mounted-Device or "HMD," such as electronic glasses).

A user 910 wearing the electronic device 101 corresponding to the HMD according to an embodiment of the present disclosure may observe image data 900 (such as, for example, an application or video data) displayed in the form of a virtual object. The user 910 wearing the electronic device 101 corresponding to the HMD may change an observation area 920 of the image data displayed in the form of the virtual object. For example, the user wearing the electronic device 101 corresponding to the HMD may move in real space, and may thus change a position of the user as represented in a virtual space.

The electronic device 101 corresponding to the HMD according to an embodiment may change the observation area 920 of an image displayed in the real space or the virtual space. The processor 120 may detect a change in a user's view and make a control to display an image corresponding to the detected view.

The electronic device 101 according to an embodiment of the present disclosure may detect a movement of the user 910 and control display information of the screen corresponding to the movement. For example, when a movement data value of the user 910 is a preset threshold movement data value (such as, for example, 5 m/s or 10 m/s), the electronic device 101 may reduce a resolution or a brightness value of the image displayed on the screen.

Figure 10A:
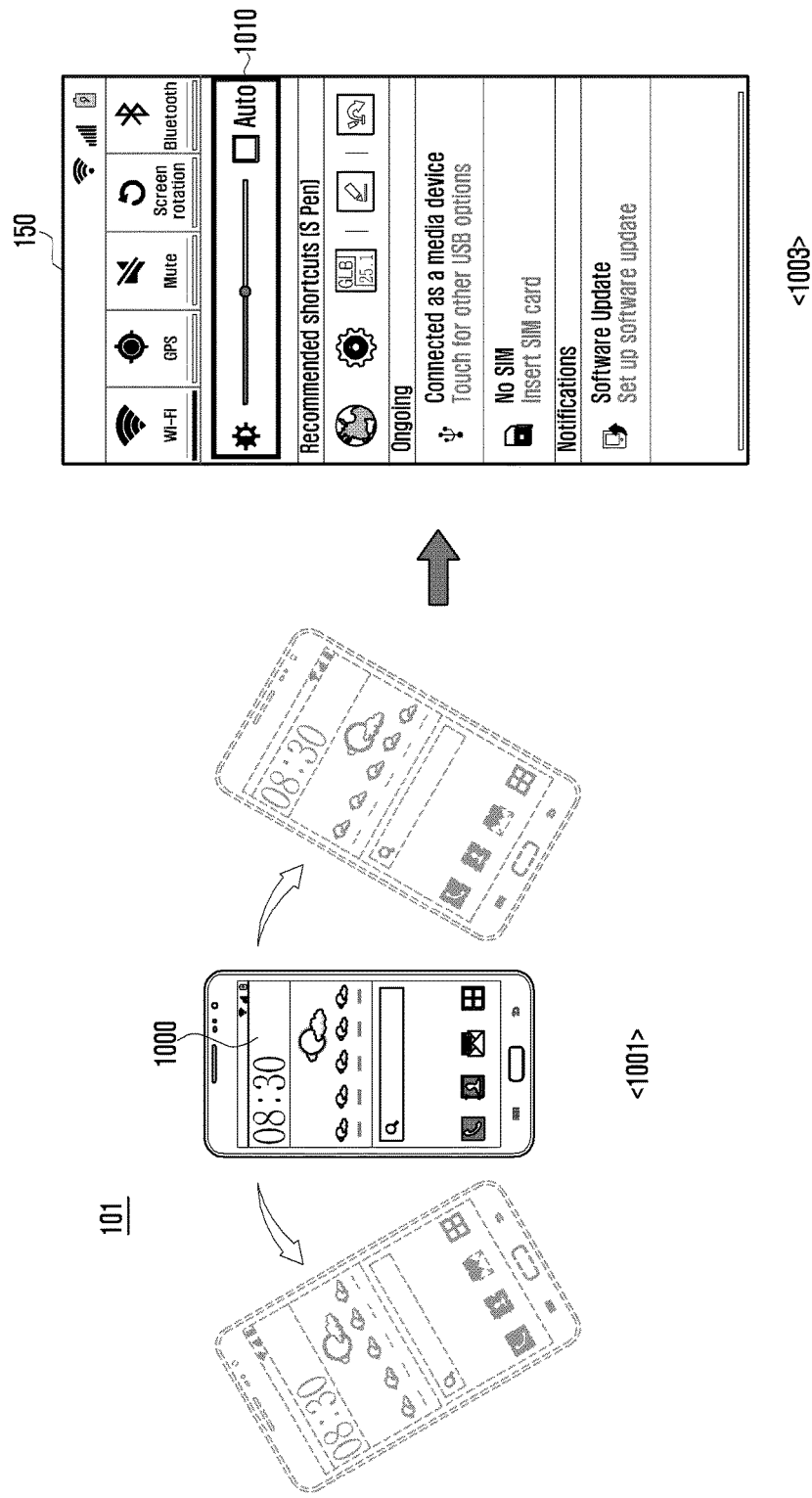
FIG. 10A and FIG. 10B schematically illustrate examples of changing screen display information based on a movement of an electronic device according to various embodiments of the present disclosure.
Figure 10B:
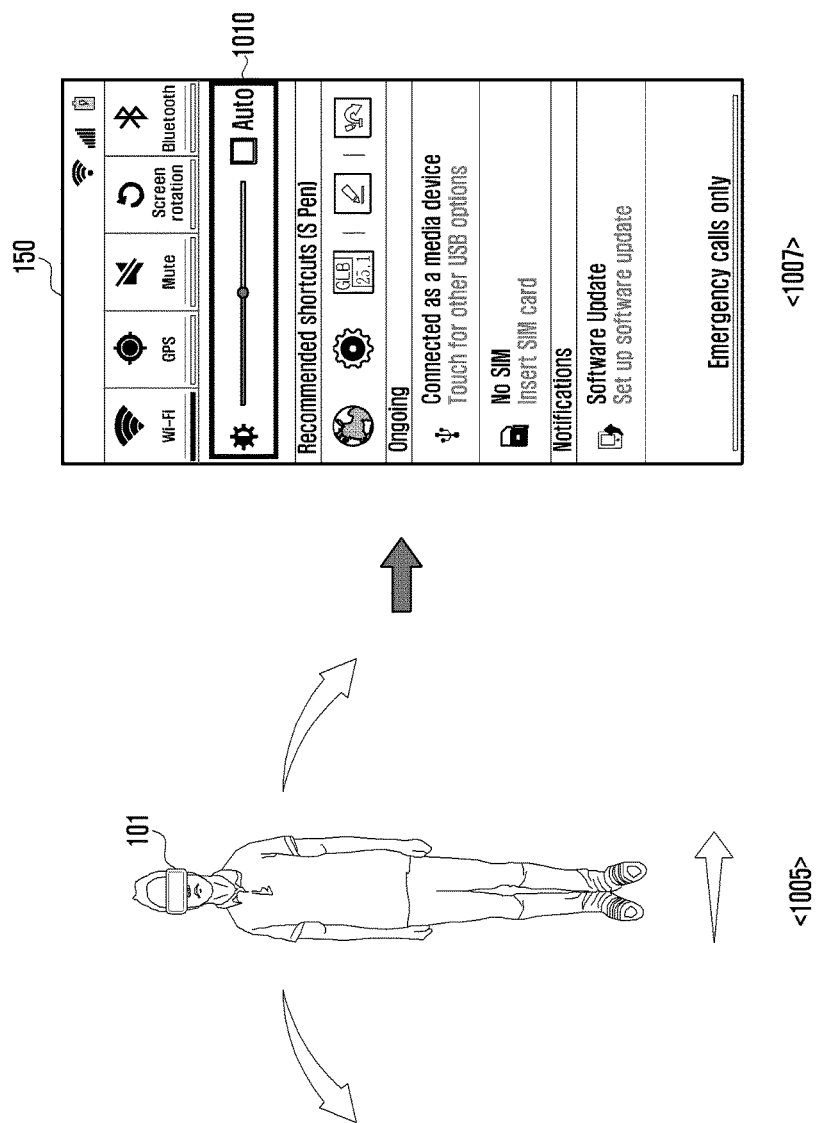

FIGS. 10A and 10B schematically illustrate examples of changing screen display information based on a movement of the electronic device 101 according to various embodiments of the present disclosure.

Referring to FIG. 10A, the electronic device 101 may detect a movement of the electronic device 101 through at least one sensor (such as, for example, gesture sensor 1540A, gyro sensor 1540B, or acceleration sensor 1540E) included in the sensor module 1540. The display control module 170 may change a resolution 1010 according to a movement of the electronic device 101.

When a movement value of the electronic device 101 is larger than a preset threshold movement value (such as, for example, 5 m/s or 20 m/s), the display control module 170 according to an embodiment may change displayed screen display information 1000. For example, when the movement value of the electronic device 101 is larger than the preset threshold movement value (such as, for example, 5 m/s or 20 m/s), the display control module 170 may reduce a resolution value and/or a brightness value.

Referring to FIG. 10B, the electronic device 101 according to an embodiment may be a wearable device (such as, for example, an HMD). The electronic device 101 may detect a movement of the electronic device 101 through at least one sensor included in the sensor module 1540 (such as, for example, gesture sensor 1540A, gyro sensor 1540B, or acceleration sensor 1540E). The display control module 170 according to an embodiment may change a resolution 1010 according to a movement of the electronic device 101.

When a movement value of the electronic device 101 is larger than a preset threshold movement value (such as, for example, 10 m/s or 500 m/s), the display control module 170 according to an embodiment may change displayed screen display information. For example, when the movement value of the electronic device 101 is larger than the preset threshold movement value (such as, for example, 10 m/s or 500 m/s), the display control module 170 may reduce a brightness value and/or a resolution value 1010 with which the application is displayed.

Figure 11:
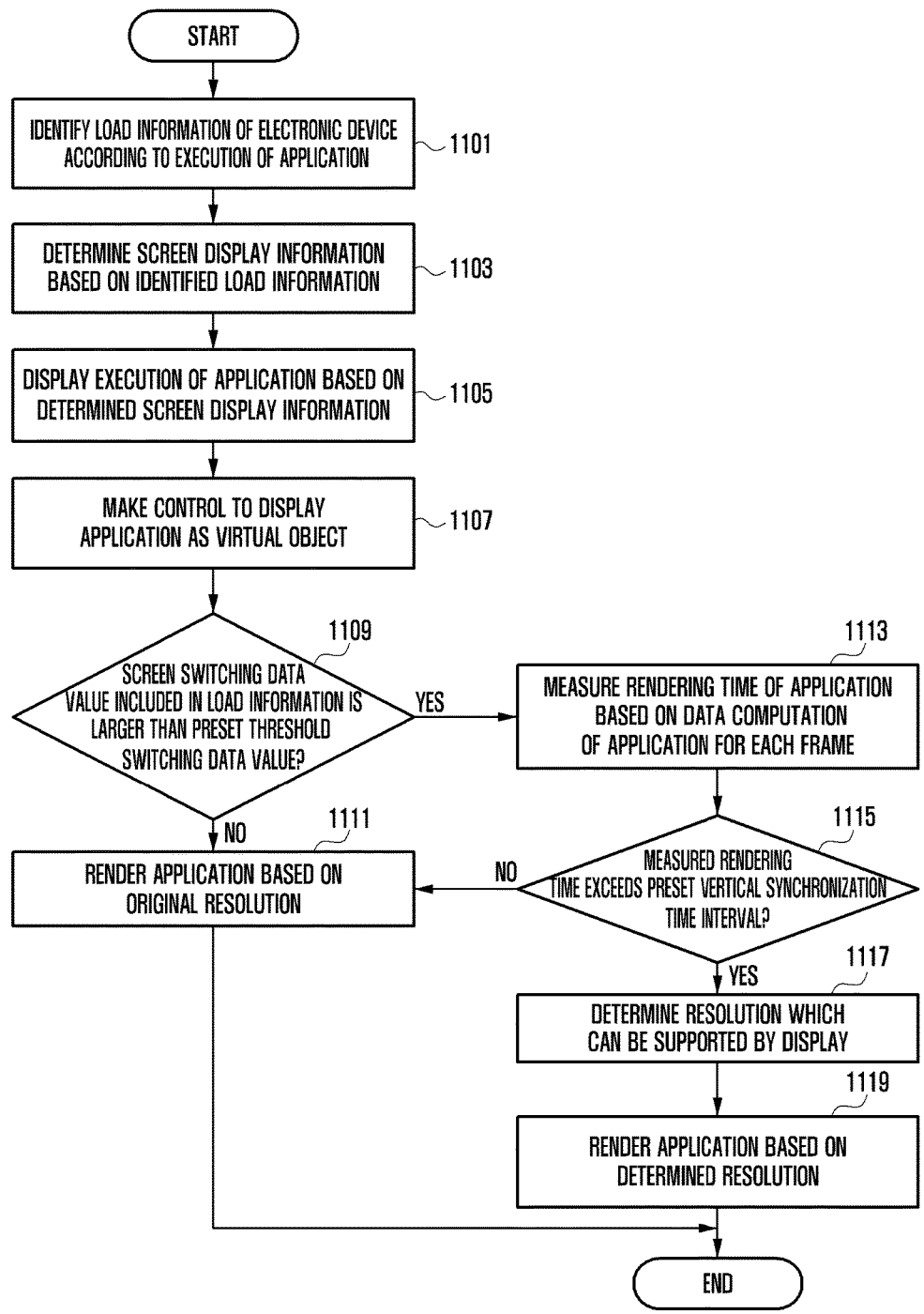
FIG. 11 is a flowchart illustrating an example operation for determining screen display information based on a movement of an electronic device according to various embodiments of the present disclosure.

FIG. 11 is a flowchart illustrating an operation for determining screen display information based on a movement of the electronic device 101 according to various embodiments of the present disclosure.

The electronic device 101 may receive an input signal for executing an application. For example, the display 150 may receive an input event for executing an application or receive a signal for making a request for executing an application from an external device (such as, for example, another electronic device 102 or 104) connected through the communication interface 160 over physical network connection or wireless network connection. The processor 120 may execute the application based on the input signal received from the external device.

The display control module 170 may identify load information of the electronic device according to the execution of the application in operation 1101. The display control module 170 may determine screen display information based on the identified load information in operation 1103. The display control module 170 may display the application based on the determined screen display information in operation 1105.

The display control module 170 displays the application as a virtual object in operation 1107. The processor 120 determines whether a screen switching data value included in the load information of the electronic device 101 is larger than a preset threshold switching data value in operation 1109. For example, the screen switching data value may be a data value corresponding to a movement speed (such as, for example, 5 m/s or 3 m/s) or a movement distance (such as, for example, 10 cm or 20 cm) of the electronic device 101. When the screen switching data value is not larger than the preset threshold switching data value, the display control module 170 renders the application based on an original resolution in operation 1111.

When the screen switching data value is larger than the preset threshold switching data value, the display control module 170 measures rendering time of application based on data computation which indicates a quantity of calculations necessary to generate each frame in operation 1113.

The display control module 170 determines whether the measured rendering time exceeds a preset vertical synchronization interval in operation 1115. When the rendering time measured in operation 1115 does not exceed the preset vertical synchronization interval, the display control module 170 renders the application based on the original resolution like in operation 1111.

When the measured rendering time exceeds the preset vertical synchronization interval, the display control module 170 determines a resolution which can be supported by the display 150 in operation 1117. For example, the display control module 170 may determine the resolution having the maximum number of frames per second (i.e., "fps") which can be supported by the display 150. The display control module 170 renders the application based on the determined resolution in operation 1119.

The display control module 170 may render the application based on the resolution determined based on the identified interval (e.g., "fps"). The display control module 170 according to an embodiment may increase the size of the rendered application through a scaler and make a control to display the increased application on the screen.

It is understood that the process described above may be subject to modification. For example, some of the operations may be omitted, or other operations may be added. That is, any one or more of operations 1101 to 1107 may be omitted, and in some embodiments, substituted or supplemented with other operations.

Figure 12:
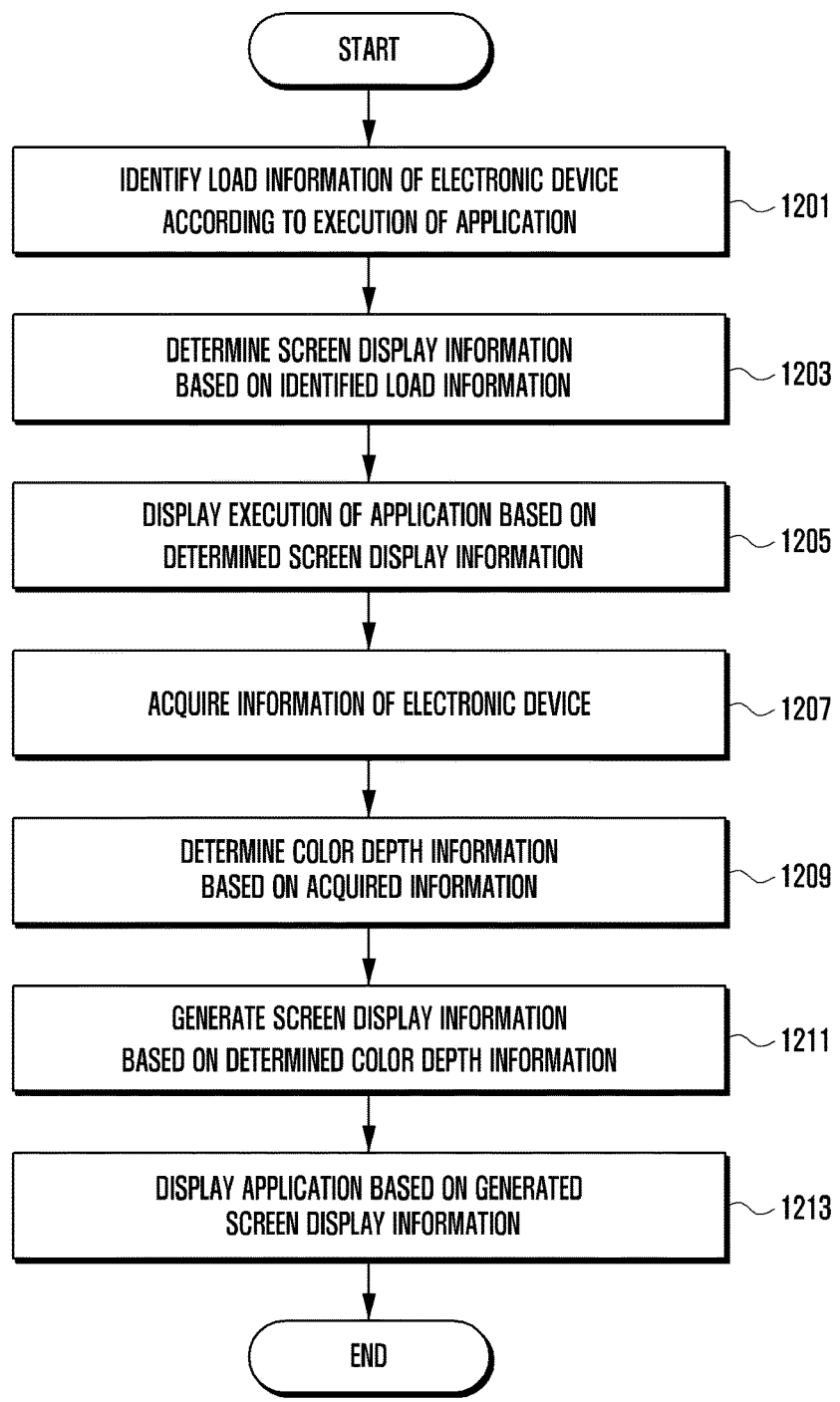
FIG. 12 is a flowchart illustrating an example operation for determining color depth information of an electronic device according to various embodiments of the present disclosure.

FIG. 12 is a flowchart illustrating an operation for determining color depth information of the electronic device 101 according to various embodiments of the present disclosure.

The electronic device 101 may receive an input signal for executing an application. For example, the display 150 may receive an input event for executing an application or receive a signal for making a request for executing an application from an external device (such as, for example, another electronic device 102 or 104) connected through the communication interface 160 over physical network connection or wireless network connection. The processor 120 may execute the application based on the input signal received from the external device.

The display control module 170 identifies load information of the electronic device according to the execution of the application in operation 1201. The display control module 170 determines screen display information based on the identified load information in operation 1203. The display control module 170 displays the application based on the determined screen display information in operation 1205.

The display control module 170 acquires information of the electronic device 101 in operation 1207. The information of the electronic device 101 may be at least one piece of type information of the display 150 classified according to a function or size provided by the display 150, brightness information of the display 150, rendering computation information of the processor 120, resolution information of the display 150, FPS information of the display 150, power saving application information of the display 150, heating information of the display 150, current consumption information of the display 150, and ambient brightness information detected by the electronic device 101.

The display control module 170 determines color depth information based on the acquired information in operation 1209. The color depth information may be information related to the number of colors which can be expressed in one pixel. For example, the color depth information may be information indicating various colors through a combination after allocating several bits to each of RGB (i.e., Red, Green, and Blue).

The display control module 170 generates screen display information based on determined color depth information in operation 1211. The display control module 170 displays the application based on the generated screen display information in operation 1213.

It is understood that the process described above is subject to variation. For example, some of the operations described above may be omitted, or other operations may be added. That is, any one or more of operations 1201 to 1205 may be omitted, and in some embodiments, substituted or supplemented with other operations.

Figure 13:
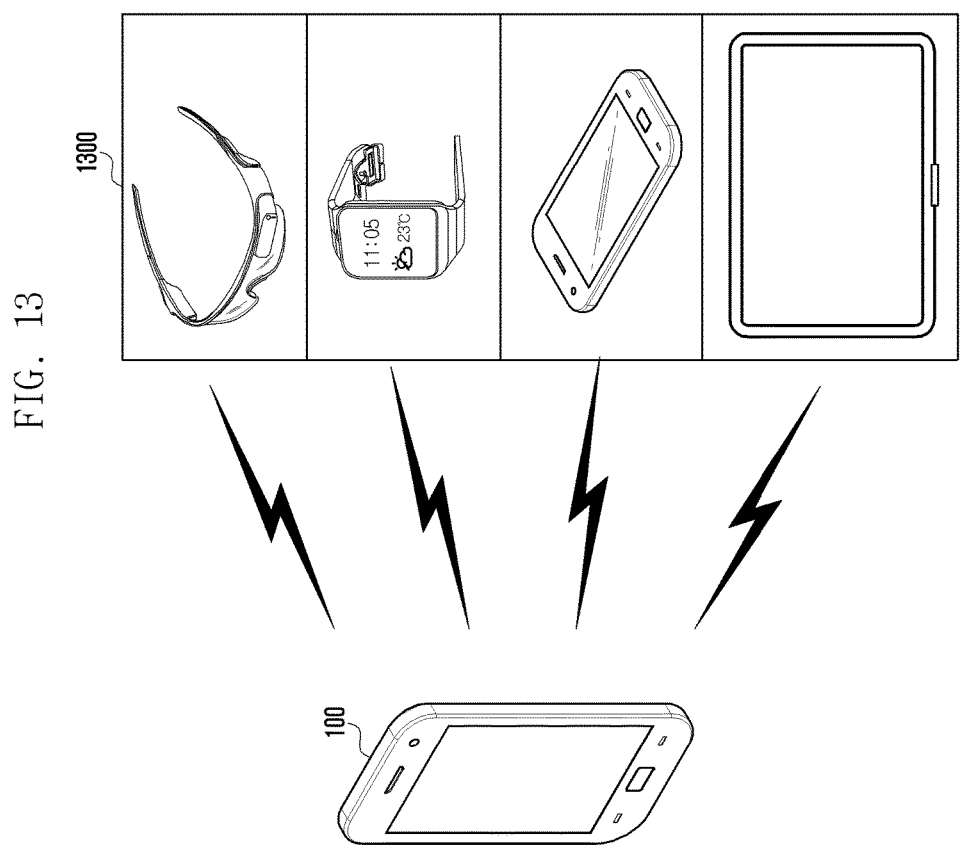
FIG. 13 schematically illustrates an example of a connection between an electronic device and another electronic device according to various embodiments of the present disclosure.

FIG. 13 schematically illustrates an example of a communicative connection between the electronic device 101 and another electronic device 1300 (such as, for example, the electronic device 102 or 104) according to various embodiments of the present disclosure.

For example, the electronic device 101 may be a portable terminal, and the other electronic device (e.g., the electronic device 102 or 104) may be an HMD, a wearable device, a portable terminal, or TV, as depicted under element 1300. The electronic device 101 according to an embodiment may receive state information of the other electronic device. The electronic device 101 may determine color depth information based on the received state information of the other electronic device. The electronic device 101 may generate screen display information based on the determined color depth information and transmit the generated screen display information to the other electronic device.

The state information of the other electronic device may be at least one piece of current consumption information of the other electronic device, temperature information, information on a power saving mode, power information corresponding to the executed application, screen size information of the other electronic device, brightness information, Frame Per Second (i.e., "FPS") information, resolution information, and rendering computation information.

Figure 14:
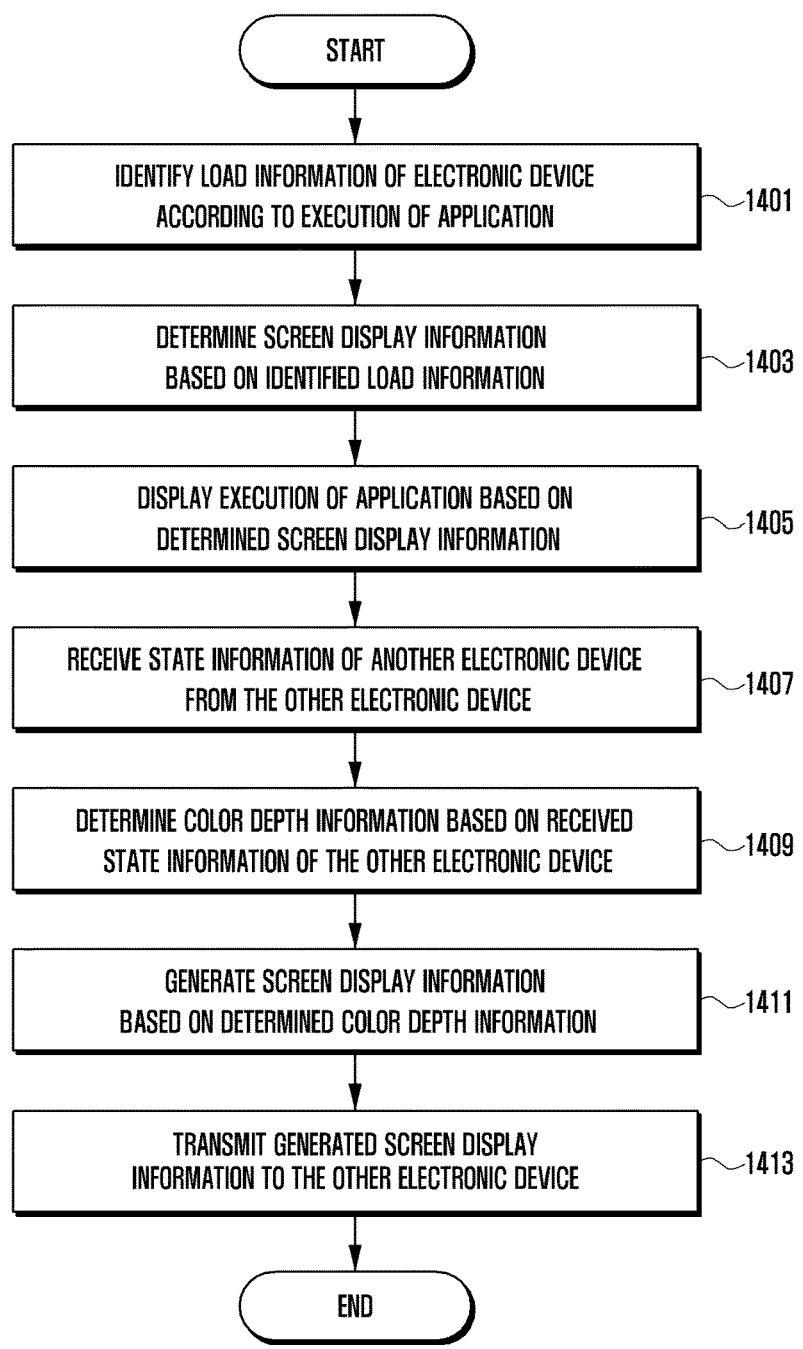
FIG. 14 is a flowchart illustrating an example operation for generating screen display information based on state information of another electronic device received from the other electronic device of an electronic device according to various embodiments of the present disclosure.

FIG. 14 is a flowchart illustrating an example operation for generating screen display information based on state information of another electronic device (such as, for example, the electronic device 102 or 104) from the other electronic device 101 of the electronic device 101 according to various embodiments of the present disclosure.

The electronic device 101 may receive an input signal for executing an application. For example, the display 150 may receive an input event for executing an application or receive a signal for making a request for executing an application from an external device (such as, for example, another electronic device 102 or 104) communicatively coupled through the communication interface 160 over physical network connection or wireless network connection. The processor 120 may execute the application based on the input signal received from the external device.

The display control module 170 may identify load information of the electronic device according to the execution of the application in operation 1401. The display control module 170 may determine screen display information based on the identified load information in operation 1403. The display control module 170 may display the application based on the determined screen display information in operation 1405.

The display control module 170 receives state information of another electronic device (such as, for example, the electronic device 102 or 104) from the other electronic device in operation 1407. The display control module 170 determines color depth information based on the received state information of the other electronic device in operation 1409. The state information of the other electronic device may be at least one piece of current consumption information, temperature information, information on a power saving mode, power information corresponding to the executed application, screen size information of the other electronic device, brightness information, Frame Per Second (i.e., "FPS") information, resolution information, and rendering computation information.

The display control module 170 generates screen display information based on the determined color depth information in operation 1411. The display control module 170 transmits the generated screen display information to the other electronic device in operation 1413.

Some of the operations may be omitted or another operation may be added. In addition, operations 1401 to 1405 may be omitted.

Figure 15:
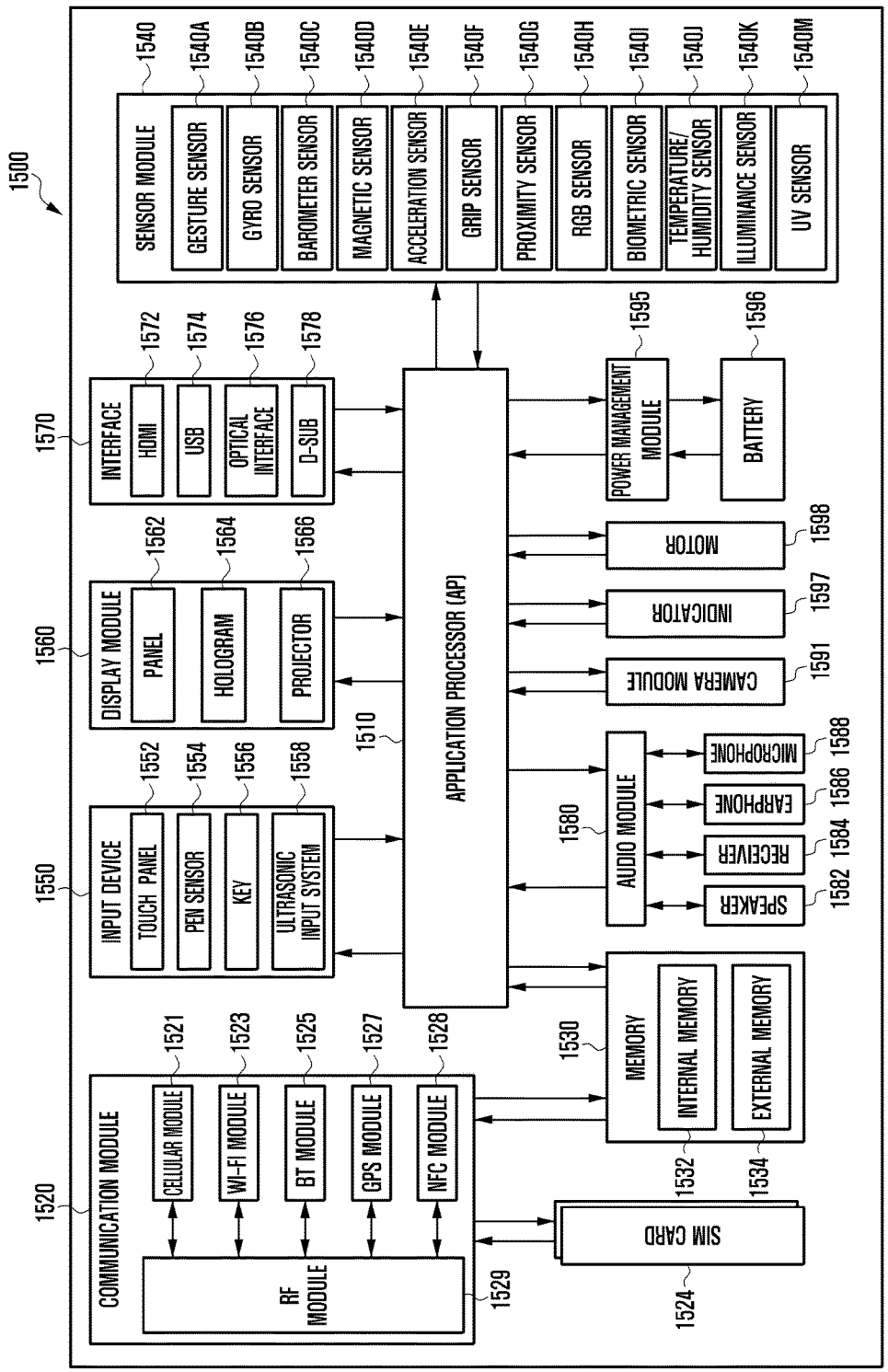
FIG. 15 is a block diagram of an example electronic device according to various embodiments of the present disclosure.

FIG. 15 is a block diagram illustrating an electronic device 1500 in accordance with an embodiment of the present disclosure. The electronic device 1500 may form, for example, the whole or part of the electronic device 101 shown in FIG. 1. Referring to FIG. 15, the electronic device 1500 may include at least one application processor (AP) 1510, a communication module 1520, a subscriber identification module (SIM) card 1524, a memory 1530, a sensor module 1540, an input unit 1550, a display 1560, an interface 1570, an audio module 1580, a camera module 1591, a power management module 1595, a battery 1596, an indicator 1597, and a motor 1598.

The AP 1510 may drive an operating system or applications, control a plurality of hardware or software components connected thereto, and also perform processing and operation for various data including multimedia data. The AP 1510 may be formed of system-on-chip (SoC), for example. According to an embodiment, the AP 1510 may further include a graphic processing unit (GPU) (not shown).

The communication module 1520 (e.g., the communication interface 160) may perform a data communication with any other electronic device (e.g., the electronic device 104 or the server 106) connected to the electronic device 1500 (e.g., the electronic device 101) through the network. According to an embodiment, the communication module 1520 may include therein a cellular module 1521, a WiFi module 1523, a BT module 1525, a GPS module 1527, an NFC module 1528, and an RF (Radio Frequency) module 1529.

The cellular module 1521 may offer a voice call, a video call, a message service, an internet service, or the like through a communication network (e.g., LTE, LTE-A, CDMA, WCDMA, UMTS, WiBro, or GSM, etc.). Additionally, the cellular module 1521 may perform identification and authentication of the electronic device in the communication network, using the SIM card 1524. According to an embodiment, the cellular module 1521 may perform at least part of functions the AP 1510 can provide. For example, the cellular module 1521 may perform at least part of a multimedia control function.

According to an embodiment, the cellular module 1521 may include a communication processor (CP). Additionally, the cellular module 1521 may be formed of SoC, for example. Although some elements such as the cellular module 1521 (e.g., the CP), the memory 1530, or the power management module 1595 are shown as separate elements being different from the AP 1510 in FIG. 15, the AP 1510 may be formed to have at least part (e.g., the cellular module 1521) of the above elements in an embodiment.

According to an embodiment, the AP 1510 or the cellular module 1521 (e.g., the CP) may load commands or data, received from a nonvolatile memory connected thereto or from at least one of the other elements, into a volatile memory to process them. Additionally, the AP 1510 or the cellular module 1521 may store data, received from or created at one or more of the other elements, in the nonvolatile memory.

Each of the WiFi module 1523, the BT module 1525, the GPS module 1527 and the NFC module 1528 may include a processor for processing data transmitted or received therethrough. Although FIG. 15 shows the cellular module 1521, the WiFi module 1523, the BT module 1525, the GPS module 1527 and the NFC module 1528 as different blocks, at least part of them may be contained in a single IC (Integrated Circuit) chip or a single IC package in an embodiment. For example, at least part (e.g., the CP corresponding to the cellular module 1521 and a WiFi processor corresponding to the WiFi module 1523) of respective processors corresponding to the cellular module 1521, the WiFi module 1523, the BT module 1525, the GPS module 1527 and the NFC module 1528 may be formed as a single SoC.

The RF module 1529 may transmit and receive data, e.g., RF signals or any other electric signals. Although not shown, the RF module 1529 may include a transceiver, a PAM (Power Amp Module), a frequency filter, an LNA (Low Noise Amplifier), or the like. Also, the RF module 1529 may include any component, e.g., a wire or a conductor, for transmission of electromagnetic waves in a free air space. Although FIG. 15 shows that the cellular module 1521, the WiFi module 1523, the BT module 1525, the GPS module 1527 and the NFC module 1528 share the RF module 1529, at least one of them may perform transmission and reception of RF signals through a separate RF module in an embodiment.

The SIM card 1524 may be a specific card formed of SIM and may be inserted into a slot formed at a certain place of the electronic device. The SIM card 1524 may contain therein an ICCID (Integrated Circuit Card IDentifier) or an IMSI (International Mobile Subscriber Identity).

The memory 1530 (e.g., the memory 130) may include an internal memory 1532 and an external memory 1534. The internal memory 1532 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 1532 may have the form of an SSD (Solid State Drive). The external memory 1534 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 1534 may be functionally connected to the electronic device 1500 through various interfaces. According to an embodiment, the electronic device 1500 may further include a storage device or medium such as a hard drive.

The sensor module 1540 may measure physical quantity or sense an operating status of the electronic device 1500, and then convert measured or sensed information into electric signals. The sensor module 1540 may include, for example, at least one of a gesture sensor 1540A, a gyro sensor 1540B, an atmospheric sensor 1540C, a magnetic sensor 1540D, an acceleration sensor 1540E, a grip sensor 1540F, a proximity sensor 1540G, a color sensor 1540H (e.g., RGB or "Red, Green, Blue" sensor), a biometric sensor 1540I, a temperature-humidity sensor 1540J, an illumination sensor 1540K, or a UV (ultraviolet) sensor 1540M. Additionally or alternatively, the sensor module 1540 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 1540 may include a control circuit for controlling one or more sensors equipped therein.

The input unit 1550 may include a touch panel 1552, a digital pen sensor 1554, a key 1556, or an ultrasonic input unit 1558. The touch panel 1552 may recognize a touch input in a manner of capacitive type, resistive type, infrared type, or ultrasonic type. Also, the touch panel 1552 may further include a control circuit. In case of a capacitive type, a physical contact or proximity may be recognized. The touch panel 1552 may further include a tactile layer. In this case, the touch panel 1552 may offer a tactile feedback to a user.

The digital pen sensor 1554 may be formed in the same or similar manner as receiving a touch input or by using a separate recognition sheet. The key 1556 may include, for example, a physical button, an optical key, or a keypad. The ultrasonic input unit 1558 is a specific device capable of identifying data by sensing sound waves with a microphone 1588 in the electronic device 1500 through an input tool that generates ultrasonic signals, thus allowing wireless recognition. According to an embodiment, the electronic device 1500 may receive a user input from any external device (e.g., a computer or a server) connected thereto through the communication module 1520.

The display 1560 (e.g., the display 150) may include a panel 1562, a hologram 1564, or a projector 1566. The panel 1562 may be, for example, LCD (Liquid Crystal Display), AM-OLED (Active Matrix Organic Light Emitting Diode), or the like. The panel 1562 may have a flexible, transparent or wearable form. The panel 1562 may be formed of a single module with the touch panel 1552. The hologram 1564 may show a stereoscopic image in the air using interference of light. The projector 1566 may project an image onto a screen, which may be located at the inside or outside of the electronic device 1500. According to an embodiment, the display 1560 may further include a control circuit for controlling the panel 1562, the hologram 1564, and the projector 1566.

The interface 1570 may include, for example, an HDMI (High-Definition Multimedia Interface) 1572, a USB (Universal Serial Bus) 1574, an optical interface 1576, or a D-sub (D-subminiature) 1578. The interface 1570 may be contained, for example, in the communication interface 160 shown in FIG. 1. Additionally or alternatively, the interface 1570 may include, for example, an MHL (Mobile High-definition Link) interface, an SD (Secure Digital) card/MMC (Multi-Media Card) interface, or an IrDA (Infrared Data Association) interface.

The audio module 1580 may perform a conversion between sounds and electric signals. At least part of the audio module 1580 may be contained, for example, in the input/output interface 140 shown in FIG. 1. The audio module 1580 may process sound information inputted or outputted through a speaker 1582, a receiver 1584, an earphone 1586, or a microphone 1588.

The camera module 1591 is a device capable of obtaining still images and moving images. According to an embodiment, the camera module 1591 may include at least one image sensor (e.g., a front sensor or a rear sensor), a lens (not shown), an ISP (Image Signal Processor, not shown), or a flash (e.g., LED or xenon lamp, not shown).

The power management module 1595 may manage electric power of the electronic device 1500. Although not shown, the power management module 1595 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 1596 and prevent overvoltage or overcurrent from a charger. According to an embodiment, the charger IC may have a charger IC used for at least one of wired or wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1596 and a voltage, current or temperature in a charging process. The battery 1596 may store or create electric power therein and supply electric power to the electronic device 1500. The battery 1596 may be, for example, a rechargeable battery or a solar battery.

The indicator 1597 may show thereon a current status (e.g., a booting status, a message status, or a recharging status) of the electronic device 1500 or of its part (e.g., the AP 1510). The motor 1598 may convert an electric signal into a mechanical vibration. Although not shown, the electronic device 1500 may include a specific processor (e.g., GPU) for supporting a mobile TV. This processor may process media data that comply with standards of DMB (Digital Multimedia Broadcasting), DVB (Digital Video Broadcasting), or media flow.

Figure 16:
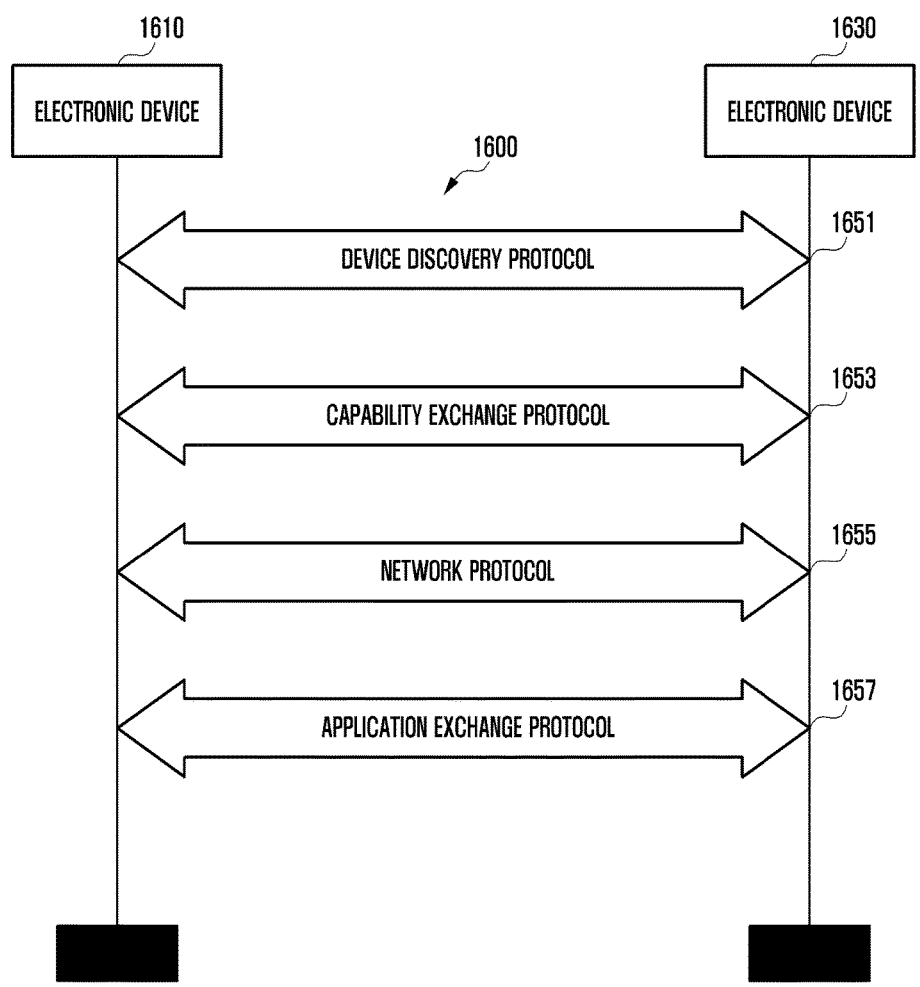
FIG. 16 illustrates an example protocol exchange between electronic devices according to various embodiments of the present disclosure.

FIG. 16 illustrates an example communication protocol 1600 between a plurality of electronic devices (such as, for example, an electronic device 1610 and an electronic device 1630) according to various embodiments of the present disclosure.

Referring to FIG. 16, the communication protocol 1600 may include a device discovery protocol 1651, a capability exchange protocol 1653, a network protocol 1655, and an application protocol 1657.

The device discovery protocol 1651 may be a protocol that allows the electronic devices (such as, for example, the electronic device 1610 or the electronic device 1630) to detect an external electronic device which can be connected thereto through short-range communication or connects the found external electronic device thereto. For example, the electronic device 1610 (such as, for example, the electronic device 101) may detect the electronic device 1630 (such as, for example, the electronic device 104) as a device, which can communicate with the electronic device 1610, through a short-range communication method (such as, for example, Bluetooth and the like) using the device discovery protocol 1651. The electronic device 1610 may acquire and store identification information of the electronic device 1630 detected through the device discovery protocol 1651 for a communication connection with the electronic device 1630. For example, the electronic device 1610 may establish the communication connection with the electronic device 1630 at least based on the identification information. The device discovery protocol 1651 may be a protocol for authenticating a plurality of electronic devices. For example, the electronic device 1610 may perform an authentication between the electronic device 1610 and the electronic device 1630 based on communication information (such as, for example, a Media Access Control (MAC) address, a Universally Unique IDentifier (UUID), a SubSystem IDentification (SSID), and an Information Provider (IP) address) for the connection with the electronic device 1630.

The capability exchange protocol 1653 may be a protocol for exchanging information related to a service function which can be supported by at least one of the electronic device 1610 and the electronic device 1630. For example, the electronic device 1610 and the electronic device 1630 may exchange information related to a service function currently provided by each of the electronic device 1610 and the electronic device 1630 through the capability exchange protocol 1653. The information which can be exchanged between the electronic devices may include identification information indicating a particular service among a plurality of services which can be supported by the electronic device 1610 and the electronic device 1630. For example, the electronic device 1610 may receive, from the electronic device 1630, identification information of a particular service provided by the electronic device 1630 through the capability exchange protocol 1653. In this case, the electronic device 1610 may determine whether the electronic device 1610 can support the particular service based on the received identification information.

The network protocol 1655 may be a protocol for controlling flows of data which is transmitted/received to provide a service linked between the electronic devices (such as, for example, the electronic device 1610 and the electronic device 1630) which are connected to communicate with each other. For example, at least one of the electronic device 1610 or the electronic device 1630 may control an error or data quality by using the network protocol 1655. Additionally or alternatively, the network protocol 1655 may determine a transport format of data transmitted/received between the electronic device 1610 and the electronic device 1630. Further, at least one of the electronic device 1610 or the electronic device 1630 may at least manage a session (such as, for example, connect or terminate a session) for a data exchange between the electronic devices by using the network protocol 1655.

The application protocol 1657 may be a protocol for providing a process or information for exchanging data related to a service provided to an external electronic device. For example, the electronic device 1610 (such as, for example, the electronic device 101) may provide a service to the electronic device 1630 (such as, for example, the electronic device 104 or the server 106) through the application protocol 1657. The communication protocol 1600 may include a standard communication protocol, a communication protocol designated by an individual or organization (such as, for example, a communication protocol self-designated by a communication device manufacturing company or a network supplying company) or a combination thereof.

The term "module" used in embodiments of the present disclosure may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), or a programmable-logic device for performing operations which has been known or are to be developed hereinafter.

According to various embodiments, at least some of the devices (such as, for example, modules or functions thereof) or the method (such as, for example, operations) according to the present disclosure may be implemented by a command stored in a computer-readable storage medium in a programming module form. When the command is executed by one or more processors (such as, for example, the processor 122), the one or more processors may execute a function corresponding to the command. The computer-readable storage medium may be, for example, the memory 130. At least a part of the programming module may be implemented (such as, for example, executed) by, for example, the application processor 1510. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (such as, for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed in a different order, some of the operations may be omitted, or other operations may be added. Further, the embodiments of the present disclosure shown in the drawings and disclosed herein are merely specific examples presented to easily describe the technical details of the present disclosure and to help the understanding of various embodiments of the present disclosure, and are not intended to limit the present disclosure. Accordingly, the present disclosure should be construed that all modifications or modified forms derived based on the technical idea of the present disclosure are included in the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising: a display configured to display an application; and a controller configured to: identify load information of the electronic device indicating load generated by execution of the application on the electronic device, alter screen display information of an execution screen of the application based on the identified load information, and control the display to display the execution screen of the application with the altered screen display information, wherein the controller applies the altered screen display information to an area of the execution screen of the application in the display, while maintaining screen display information of a remaining area of the screen excluding the area of the execution screen, and wherein the controller is configured to alter screen display information in response to detecting an available capacity value of a memory of the electronic device that is reduced by the execution of the application is equal to or smaller than a preset threshold capacity value, the preset threshold capacity value different than a total capacity of the memory.

2. The electronic device of claim 1, wherein the controller is further configured to:
generate a control signal for altering the screen display information and update the screen display information based on the generated control signal, and
control the display to display a execution screen of the application based on the updated screen display information,
wherein the preset threshold capacity value is less than the total capacity of the memory.

3. The electronic device of claim 2, wherein the controller is further configured to:
control the display to display a user interface on the display allowing alteration of the screen display information, and
detect a change input event indicating a desired change to the screen display information through the displayed user interface,
wherein the user interface includes a first user interface selectable to alter a resolution of the display displayed adjacently to a second user interface selectable to alter a brightness of the display, the first user interface further including a first graphic selectable to manually control the resolution, and an auto icon selectable to allow automatic adjustment of the resolution.

4. The electronic device of claim 2, wherein the control signal is generated based on state information of the electronic device, and
the controller is further configured to generate the control signal for altering the screen display information when detecting a temperature value of at least one of a processor and a battery of the electronic device larger than or equal to a preset threshold temperature value.

5. The electronic device of claim 2, wherein the controller is further configured to generate the control signal for altering the screen display information when detecting a battery remaining capacity equal to or smaller than a preset battery capacity.

6. The electronic device of claim 2, wherein the control signal is generated based on a content received from the application, and
the controller is further configured to:
identify at least one of a text information value of content, an image information value of content, a video information value of content, and an information value related to a change in a resolution for each frame of content, the content being included in the application, and
generate the control signal for altering the screen display information if at least one of the text information value, the image information value, the video information value, and the information value related to the change in the resolution for each frame is larger than or equal to a preset threshold content information value.

7. The electronic device of claim 1, wherein the screen display information includes at least one of a position where the application is displayed, size information of the application, scale information for enlarging the application, color depth information of the application, and resolution information of the application.

8. The electronic device of claim 1, wherein the load information of the electronic device includes at least one of available memory capacity of the electronic device, a processor temperature and battery temperature of the electronic device, and battery remaining capacity of the electronic device.

9. The electronic device of claim 4, wherein the control signal for altering the screen display information is generated based on the state information of the electronic device, and the controller is further configured to:
detect whether the state information of the electronic device changes, and
if the state information of the electronic device changes, generate the control signal based on the changed state information of the electronic device.

10. The electronic device of claim 1, wherein the controller is further configured to control the display to divide a screen area of the display to display the application and a second application into two or more display areas,
alter screen display information of each of the two or more display areas, and
control the display to display execution screen of the application and execution screen of the second application in the two or more display areas based on the altered screen display information, respectively.

11. The electronic device of claim 10, wherein a control signal for altering the screen display information is generated based on at least one of:
a user input indicating selection of at least one of the two or more display areas for the application and the second application; and
content received from the application and the second application.

12. The electronic device of claim 11, wherein the controller is further configured to:
identify at least one of a text information value of contents, an image information value of contents, a video information value of contents, and an information value related to a change in a resolution for each frame of contents, the contents being included in the application, and
generate the control signal for altering the screen display information if at least one of the text information value, the image information, the video information value, and the information value related to the change in the resolution for each frame is larger than or equal to a preset threshold content information value.

13. The electronic device of claim 1, wherein the controller is further configured to:
control the display to display the application as a virtual object and determine whether a screen switching data value included in the load information of the electronic device is larger than a preset threshold screen switching data value, determine a resolution based on a result of the determination and renders the application based on the determined resolution.

14. An electronic device comprising:
a display configured to display an application; and
a controller configured to:
identify load information of the electronic device indicating load generated by execution of the application on the electronic device, wherein the load information comprises a rendering time of the application based on data computation for each frame of the application,
alter screen display information of an execution screen of the application based on the identified load information, wherein altering the screen display information comprises lowering a resolution when the rendering time exceeds a preset vertical synchronization signal interval of the display, and
controlling a display of the electronic device to display the execution screen of the application with the altered screen display information.

15. The electronic device of claim 1, wherein the controller is further configured to:
acquire at least one of type information of the display, the type information being classified according to a function or a size of the display, a brightness information of the display, a rendering computation information of a processor, a resolution information of the display, a frames-per-second information of the display, power saving mode for the display, heating information of the display, a power consumption information of the display, and an environmental ambient brightness information detected by the electronic device,
detect color depth information based on the type information, and
generate screen display information based on the detected color depth information, and display the application based on the generated screen display information.

16. The electronic device of claim 1, further comprising a communication interface for receiving state information of an external electronic device transmitted from the external electronic device, wherein the controller is further configured to determine color depth information based on the received state information of the external electronic device, and generate screen display information based on the determined color depth information, and transmits, by the communication interface, the generated screen display information to the external electronic device.

17. The electronic device of claim 16, wherein the state information of the external electronic device includes at least one of a current power consumption, temperature information, power saving mode information, power information for an executed application, screen size information, brightness information, frames-per-second information, resolution information, and rendering computation information.

18. A method for an electronic device, comprising:
identifying, by a controller, load information of the electronic device indicating load generated by execution of an application;
alter screen display information of a displayed execution screen of the application based on the identified load information by the controller; and
controlling a display of the electronic device to display the execution screen of the application with the altered screen display information,
wherein controlling of the display comprises: applying the altered screen display information to an area of the execution screen of the application in the display, while maintaining screen display information of a remaining area of the screen excluding the area of the execution screen, and
wherein the screen is altered to display information in response to detecting an available capacity value of a memory of the electronic device that is reduced by the execution of the application is equal to or smaller than a preset threshold capacity value, the preset threshold capacity value different than a total capacity of the memory.

19. The method of claim 18, further comprising:
generating a control signal for altering the screen display information;
updating the screen display information based on the generated control signal; and
controlling the display to display a screen of the application based on the updated screen display information,
wherein the preset threshold capacity value is less than the total capacity of the memory.

20. The method of claim 19, wherein the generating of the control signal comprises at least one of:
displaying an user interface for altering the screen display information and generating the control signal in response to receiving an input event through the user interface;
generating the control signal based on state information of the electronic device; and
generating the control signal based on content provided by the application,
wherein the user interface includes a first user interface selectable to alter a resolution of the display displayed adjacently to a second user interface selectable to alter a brightness of the display, the first user interface further including a first graphic selectable to manually control the resolution, and an auto icon selectable to allow automatic adjustment of the resolution.

21. The method of claim 20, wherein the generating the control signal based on the state information of the electronic device comprises at least one of:
identifying a temperature value of at least one of the controller and a battery of the electronic device, and generating the control signal if the identified temperature value is larger than or equal to a preset threshold temperature value;
identifying an available capacity value of a memory of the electronic device, and generating the control signal if the identified available capacity value of the memory is equal to or smaller than a preset threshold capacity value; and
identifying a battery remaining capacity of the electronic device, and generating the control signal if the battery remaining capacity is equal to or smaller than a preset battery capacity.

22. The method of claim 20, wherein the generating of the screen display information based on the content comprises:
identifying at least one of a text information value of the content, an image information value of the content, a video information value of the content, and an information value related to a change in a resolution for each frame of the content, the content being included in the application; and generating the control signal if at least one of the text information value, the image information value, the video information value, and the information value related to the change in the resolution for each frame is larger than or equal to a preset threshold content information value.

23. The method of claim 18, wherein the screen display information includes at least one of a position where the application is displayed, size information of the application, scale information for enlarging the application, color depth information of the application, and resolution information of the application.

24. The method of claim 18, wherein the load information of the electronic device includes at last one of an available memory capacity of the electronic device, a temperature of a processor and a battery of the electronic device, and a battery remaining capacity of the electronic device.

25. The method of claim 20, further comprising, if the controller further generates the control signal based on the state information of the electronic device, detecting whether the state information of the electronic device changes; and
if the state information of the electronic device changes, updating the altered screen display information based on the changed state information of the electronic device.

26. The method of claim 18, further comprising:
controlling the display to divide a screen area to display the application and a second application into two or more display areas of the display;
altering screen display information of each of the two or more display areas; and
controlling the display to display execution screens of the application and execution screen of the second application in the two or more display areas based on the altered screen display information, respectively.

27. The method of claim 26, wherein detecting the screen display information of each of the two or more display areas further comprises at least one of:
a user input indicating selection of at least one of the two or more display areas for the application and the second application; and
content received from the application and the second application.

28. The method of claim 27, wherein the screen display information is detected based on the content received from the application and the second application, the method further comprising:
identifying at least one of a text information value of the content, an image information value of the content, a video information value of the content, and an information value related to a change in a resolution for each frame of the content, the content being included in the application; and
generating a control signal for altering the screen display information if at least one of the identified text information value, the image information value, the video information value, and the information value related to the change in the resolution for each frame is larger than or equal to a preset threshold content information value.

29. The method of claim 18, further comprising:
controlling the display to display the application as a virtual object;
determining whether a screen switching data value including the load information of the electronic device is larger than a preset threshold screen switching data value by the controller; and
detecting a resolution based on a result of the determination and rendering the application based on the detected resolution.

30. The method of claim 29, wherein rendering of the application further comprises:
when the screen switching data value detected through a motion sensor of the electronic device is larger than the preset threshold switching data value, measuring a rendering time of the application based on data computation of the application for each frame by the controller;
determining whether the measured rendering time exceeds a preset vertical synchronization signal interval of the display by the controller detecting a resolution which supportable by the display based on the result of the determination; and
rendering the application based on the detected resolution.

31. The method of claim 18, further comprising:
detecting acquired information including at least one of a display function, a display size, brightness information of the display, a rendering computation of the controller, a resolution information of the display, frames-per-second information of the display, power saving mode for the display, a temperature of the display, power consumption of the display, and environmental ambient brightness detected by the electronic device;
detecting color depth information based on the acquired information; and
generating screen display information based on the detected color depth information and displaying the application based on the generated screen display information.

32. The method of claim 18, further comprising:
receiving state information of an external electronic device from the external electronic device by a communication interface of the electronic device;
detecting color depth information of the external electronic device based on the received state information;
generating screen display information based on the detected color depth information; and
transmitting the generated screen display information to the external electronic device by the communication interface.

33. The method of claim 32, wherein the state information of the external electronic device includes at least one of a current power consumption information, temperature information, power saving mode information, power information for an executed application, screen size information, brightness information, frames-per-second information, resolution information, and rendering computation information.

34. A non-transitory computer-readable storage medium having a program recorded therein, the program comprising program instructions executable by a processor of an electronic device to:
execute an application in response to detecting an input event for executing the application;
identify load information of the electronic device indicating load generated by the execution of the application;
altering screen display information of a displayed execution screen of the application based on the identified load information; and
control a display to display the execution screen of the executed application with the altered screen display information, by applying the altered screen display information to an area of the execution screen of the application in the display, while maintaining screen display information of a remaining area of the screen excluding the area of the execution screen, and wherein the screen is altered to display information in response to detecting an available capacity value of a memory of the electronic device that is reduced by the execution of the application is equal to or smaller than a preset threshold capacity value, the preset threshold capacity value different than a total capacity of the memory.

* * * * *